United States Patent
Gerdes et al.

(10) Patent No.: US 12,385,777 B2
(45) Date of Patent: Aug. 12, 2025

(54) ACOUSTIC DETECTION OF CARGO MASS CHANGE

(71) Applicant: ORACLE INTERNATIONAL CORPORATION, Redwood Shores, CA (US)

(72) Inventors: Matthew T. Gerdes, Oakland, CA (US); Guang C. Wang, San Diego, CA (US); Timothy D. Cline, Gainesville, VA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 277 days.

(21) Appl. No.: 18/098,277

(22) Filed: Jan. 18, 2023

(65) Prior Publication Data

US 2023/0358597 A1    Nov. 9, 2023

Related U.S. Application Data

(63) Continuation-in-part of application No. 17/735,245, filed on May 3, 2022, now Pat. No. 12,158,548.

(51) Int. Cl.
*G01H 3/08* (2006.01)
*G06F 17/14* (2006.01)
(Continued)

(52) U.S. Cl.
CPC .............. *G01H 3/08* (2013.01); *G06F 17/14* (2013.01); *G06F 17/18* (2013.01); *G08B 21/00* (2013.01)

(58) Field of Classification Search
None
See application file for complete search history.

(56) References Cited

U.S. PATENT DOCUMENTS 3,705,516 A    12/1972 Reis
4,635,058 A    1/1987 Sutphin, Jr.
(Continued)

FOREIGN PATENT DOCUMENTS

CN    107181543 A1    9/2017
CN    110941020 A1    3/2020
(Continued)

OTHER PUBLICATIONS

Kolgaonkar, Amar. "Correlation of Acoustic Emission Parameters With Weight and Velocity of Moving Vehicles." (2005). (Year: 2005).*

(Continued)

*Primary Examiner* — Isam A Alsomiri
*Assistant Examiner* — Jonathan D Armstrong
(74) *Attorney, Agent, or Firm* — Kraguljac Law Group LLC

(57) ABSTRACT

Systems, methods, and other embodiments associated with acoustic detection of changes in mass of cargo carried by a vehicle are described herein. In one example method for acoustic cargo surveillance, a first acoustic output of a vehicle carrying cargo at a first time of surveillance of the vehicle is recorded. Then, a second acoustic output of the vehicle at a subsequent time in the surveillance of the vehicle carrying the cargo is recorded. A change in a mass of the cargo carried by the vehicle is acoustically detected based at least on an acoustic change between the first acoustic output and the second acoustic output. An electronic alert is generated that the mass of the cargo has changed based on the acoustic change.

20 Claims, 9 Drawing Sheets

(51) Int. Cl.
  *G06F 17/18* (2006.01)
  *G08B 21/00* (2006.01)

(56) References Cited

U.S. PATENT DOCUMENTS

| | | |
|---|---|---|
| 4,686,655 A | 8/1987 | Hyatt |
| 5,357,484 A | 10/1994 | Bates et al. |
| 5,619,616 A | 4/1997 | Brady et al. |
| 7,020,802 B2 | 3/2006 | Gross et al. |
| 7,071,841 B2* | 7/2006 | Haynes .................. G01S 11/14 |
| | | 701/119 |
| 7,191,096 B1 | 3/2007 | Gross et al. |
| 7,281,112 B1 | 10/2007 | Gross et al. |
| 7,292,659 B1 | 11/2007 | Gross et al. |
| 7,391,835 B1 | 6/2008 | Gross et al. |
| 7,542,995 B2 | 6/2009 | Thampy et al. |
| 7,573,952 B1 | 8/2009 | Thampy et al. |
| 7,613,576 B2 | 11/2009 | Gross et al. |
| 7,613,580 B2 | 11/2009 | Gross et al. |
| 7,702,485 B2 | 4/2010 | Gross et al. |
| 7,869,977 B2 | 1/2011 | Lewis et al. |
| 8,055,594 B2 | 11/2011 | Dhanekula et al. |
| 8,069,490 B2 | 11/2011 | Gross et al. |
| 8,111,174 B2* | 2/2012 | Berger .................. G08G 1/015 |
| | | 340/933 |
| 8,150,655 B2 | 4/2012 | Dhanekula et al. |
| 8,164,484 B2* | 4/2012 | Berger .................. G08G 1/015 |
| | | 701/119 |
| 8,200,991 B2 | 6/2012 | Vaidyanathan et al. |
| 8,214,682 B2 | 7/2012 | Vaidyanathan et al. |
| 8,275,738 B2 | 9/2012 | Gross et al. |
| 8,341,759 B2 | 12/2012 | Gross et al. |
| 8,365,003 B2 | 1/2013 | Gross et al. |
| 8,452,586 B2 | 5/2013 | Master et al. |
| 8,457,913 B2 | 6/2013 | Zwinger et al. |
| 8,543,346 B2 | 9/2013 | Gross et al. |
| 8,983,677 B2 | 3/2015 | Wright et al. |
| 9,093,120 B2 | 7/2015 | Bilobrov |
| 9,514,213 B2 | 12/2016 | Wood et al. |
| 9,911,336 B2 | 3/2018 | Schlechter et al. |
| 9,933,338 B2 | 4/2018 | Noda et al. |
| 10,015,139 B2 | 7/2018 | Gross et al. |
| 10,149,169 B1 | 12/2018 | Keller |
| 10,403,141 B2 | 9/2019 | Patil |
| 10,452,510 B2 | 10/2019 | Gross et al. |
| 10,496,084 B2 | 12/2019 | Li et al. |
| 10,860,011 B2 | 12/2020 | Gross et al. |
| 10,929,776 B2 | 2/2021 | Gross et al. |
| 11,042,428 B2 | 6/2021 | Gross et al. |
| 11,055,396 B2 | 7/2021 | Gross et al. |
| 11,255,894 B2 | 2/2022 | Wetherbee et al. |
| 11,377,111 B1* | 7/2022 | Guziec .................. G01G 19/086 |
| 11,392,786 B2 | 7/2022 | Gross et al. |
| 11,408,988 B2* | 8/2022 | Brabant ................ G01S 13/862 |
| 11,686,756 B2* | 6/2023 | Wetherbee .............. G06F 21/44 |
| | | 324/612 |
| 2001/0044719 A1 | 11/2001 | Casey |
| 2003/0033094 A1 | 2/2003 | Huang |
| 2003/0061008 A1 | 3/2003 | Smith et al. |
| 2004/0258154 A1 | 12/2004 | Liu et al. |
| 2005/0219042 A1* | 10/2005 | Thomson ............ B60R 25/1004 |
| | | 340/666 |
| 2006/0037400 A1* | 2/2006 | Haynes .................. G01S 11/14 |
| | | 73/587 |
| 2006/0181413 A1* | 8/2006 | Mostov .................. G08B 25/08 |
| | | 340/539.22 |
| 2007/0190368 A1 | 8/2007 | Jung |
| 2007/0195646 A1 | 8/2007 | Bovindswamy |
| 2007/0288242 A1 | 12/2007 | Spengler et al. |
| 2008/0140362 A1 | 6/2008 | Gross et al. |
| 2008/0252309 A1 | 10/2008 | Gross et al. |
| 2008/0252441 A1 | 10/2008 | McElfresh et al. |
| 2008/0256398 A1 | 10/2008 | Gross et al. |
| 2008/0277196 A1 | 11/2008 | Rapp |
| 2009/0099830 A1 | 4/2009 | Gross et al. |
| 2009/0115635 A1 | 5/2009 | Berger |
| 2009/0125467 A1 | 5/2009 | Dhanekula et al. |
| 2009/0306920 A1 | 12/2009 | Zwinger et al. |
| 2010/0023282 A1 | 1/2010 | Lewis et al. |
| 2010/0033386 A1 | 2/2010 | Lewis et al. |
| 2010/0080086 A1* | 4/2010 | Wright .................. H04K 3/45 |
| | | 367/191 |
| 2010/0161525 A1 | 6/2010 | Gross et al. |
| 2010/0305892 A1 | 12/2010 | Gross et al. |
| 2010/0306165 A1 | 12/2010 | Gross et al. |
| 2011/0169664 A1* | 7/2011 | Berger .................. G08G 1/015 |
| | | 340/943 |
| 2012/0030775 A1 | 2/2012 | Gross et al. |
| 2012/0245978 A1 | 9/2012 | Jain et al. |
| 2013/0154829 A1* | 6/2013 | Mostov .................. G08B 25/08 |
| | | 248/213.2 |
| 2013/0157683 A1 | 6/2013 | Lymberopoulos et al. |
| 2013/0158898 A1* | 6/2013 | Fukuda ............... B60R 16/0236 |
| | | 702/45 |
| 2013/0211662 A1 | 8/2013 | Blumer et al. |
| 2015/0137830 A1 | 5/2015 | Keller, III et al. |
| 2016/0021435 A1 | 1/2016 | Topchy |
| 2016/0098561 A1 | 4/2016 | Keller et al. |
| 2016/0258378 A1 | 9/2016 | Bizub et al. |
| 2017/0163669 A1 | 6/2017 | Brown et al. |
| 2018/0011130 A1 | 1/2018 | Aguayo Gonzalez et al. |
| 2018/0053413 A1 | 2/2018 | Patil |
| 2018/0349797 A1 | 12/2018 | Garvey et al. |
| 2019/0041842 A1 | 2/2019 | Cella et al. |
| 2019/0064034 A1 | 2/2019 | Fayfield et al. |
| 2019/0102718 A1 | 4/2019 | Agrawal |
| 2019/0163719 A1 | 5/2019 | Gross et al. |
| 2019/0196892 A1 | 6/2019 | Matei et al. |
| 2019/0197145 A1 | 6/2019 | Gross et al. |
| 2019/0233185 A1 | 8/2019 | Strong |
| 2019/0237997 A1 | 8/2019 | Tsujii et al. |
| 2019/0243799 A1 | 8/2019 | Gross et al. |
| 2019/0286725 A1 | 9/2019 | Gawlick et al. |
| 2019/0324430 A1 | 10/2019 | Herzog et al. |
| 2019/0378022 A1 | 12/2019 | Wang et al. |
| 2020/0096624 A1* | 3/2020 | Brabant ................ G01S 13/862 |
| 2020/0125819 A1 | 4/2020 | Gross et al. |
| 2020/0144204 A1 | 5/2020 | Keller, III et al. |
| 2020/0201950 A1 | 6/2020 | Wang et al. |
| 2021/0081573 A1 | 3/2021 | Gross et al. |
| 2021/0158202 A1 | 5/2021 | Backlawski et al. |
| 2021/0174248 A1 | 6/2021 | Wetherbee et al. |
| 2021/0270884 A1 | 9/2021 | Wetherbee et al. |
| 2021/0406374 A1 | 12/2021 | Wang et al. |
| 2022/0121955 A1 | 4/2022 | Chavoshi et al. |
| 2023/0159037 A1* | 5/2023 | Guziec ................. G01G 19/086 |
| | | 701/70 |

FOREIGN PATENT DOCUMENTS

| | | |
|---|---|---|
| WO | 2009046359 A2 | 4/2009 |
| WO | 2020215116 A1 | 10/2020 |

OTHER PUBLICATIONS

Bowie, Jeanne M. "Development of a weigh-in-motion system using acoustic emission sensors." (2011). (Year: 2011).*

U.S. Patent and Trademark Office (USPTO), US Office Action in co-pending U.S. Appl. No. 17/735,245, filed May 3, 2022 having a date of mailing of Oct. 4, 2023 (22 pgs.).

Petros Maragos, Morphological Correlation and Mean Absolute Error Criteria, Division of Applied Sciences, Harvard University, Cambridge, MA, downloaded on May 3, 2023 from IEEE Xplore; pp. 1-4.

Kenny Gross, Oracle Labs; MSET2 Overview: "Anomaly Detection and Prediction" Oracle Cloud Autonomous Prognostics; p. 1-58; Aug. 8, 2019.

Gross, K. C. et al., "Application of a Model-Based Fault Detection System to Nuclear Plant Signals," downloaded from https://www.researchgate.net/publication/236463759; Conference Paper: May 1, 1997, 5 pages.

(56) References Cited

OTHER PUBLICATIONS

Patent Cooperation Treaty (PCT), International Search Report and Written Opinion issued in PCT International Application No. PCT/US2021/015802 having a date of mailing of May 28, 2021 (13 pgs).
Patent Cooperation Treaty (PCT), International Search Report and Written Opinion issued in PCT International Application No. PCT/US2021/013633 having a date of mailing of May 6, 2021 (10 pgs).
Huang H, et al. "Electronic counterfeit detection based on the measurement of electromagnetic fingerprint," Microelectronics Reliability: An Internat . Journal & World Abstracting Service, vol. 55, No. 9, Jul. 9, 2015 (Jul. 9, 2015) pp. 2050-2054.
Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.
Patent Cooperation Treaty (PCT), International Search Report and Written Opinion issued in PCT International Application No. PCT/US2021/014106 having a date of mailing of Apr. 26, 2021 (9 pgs).
Patent Cooperation Treaty (PCT), International Search Report and Written Opinion issued in PCT International Application No. PCT/US2021/015359 having a date of mailing of Apr. 9, 2021 (34 pgs).
Dickey et al.; Checking for Autocorrelation in Regression Residuals; pp. 959-965; Proceedings of 11th Annual SAS Users Group International Conference; 1986.
Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.
Gou, Yuhua, "Implementation of 3d Kiviat Diagrams." (2008). (Year: 2008).
Wang, Ray C., et al., Process Fault Detection Using Time-Explicit Kiviat Diagrams. AIChE Journal 61.12 (2015): 4277-4293.
US Patent and Trademark Office, "Non-Final Office Action", issued in U.S. Appl. No. 16/804,531 having a date of mailing of Jul. 20, 2021( pgs).
Whisnant et al.; "Proactive Fault Monitoring in Enterprise Servers," IEEE—International Multiconference in Computer Science & Computer Engineering (Jun. 27-30, 2005) 11 pgs.
US Nuclear Regulatory Commission; "Technical Review of On-Line Monitoring Techniques for Performance Assessment," vol. 1, Jan. 31, 2006.
Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.
Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.
Wald, A, "Sequential Probability Ratio Test for Reliability Demonstration", John Wiley & Sons, 1947.
Seyerlehner, Klaus et al., "Frame Level Audio Similarity—a Codebook Approach", Proc. of the 11th Int. Conference on Digital Audio Effects (DAFx-08), Espoo, Finland, Sep. 1-4, 2008 (8 pgs).
Casey, et al.; "Audio Shingling for Measuring Musical Similarity", Purdue University—Engineering 2006 pp. 1-8.
Yesilli et al.: "On Transfer Learning for Chatter Detection in Turning using Wavelet Packet Transform and Ensemble Empirical Mode Decomposition", Cirp Journal of Manufacturing Science and Technology, Elsevier, Amsterdam, NL, vol. 28, Dec. 30, 2019 (Dec. 30, 2019), pp. 118-135.
Abebe Diro et al.; A Comprehensive Study of Anomaly Detection Schemes in IoT Networks Using Machine Learning Algorithms; pp. 1-13; 2021; downloaded from: https://doi.org/10.3390/s21248320.
Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.
Choi Kukjin et al: "Deep Learning for Anomaly Detection in Time-Series Data: Review, Analysis, and Guidelines", IEEE Access, IEEE, USA, vol. 9, Aug. 26, 2021, (23 pgs).
Gross Kenny et al: "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.
Abran et al., "Estimation models based on functional profiles," Intl. Workshop on Software Measurement—IWSM/MetriKon, Kronisburg (Germany) Shaker Verlag. 2004 (Year: 2004).
Paulraj, et al; "Moving Vehicle Recognition and Classification Based on Time Domain Approach", Malaysian Technical Universities Conference on Engineering & Technology, MUCET 2012, Part 1—Electronic and Electrical Engineering, Procedia Engineering 53, pp. 405-410 (https:\\www.sciencedirect.com).
U.S. Patent and Trademark Office (USPTO), US Office Action in co-pending U.S. Appl. No. 17/735,245, filed May 3, 2022 having a date of mailing of Jan. 19, 2024 (18 pgs.).
U.S. Patent and Trademark Office (USPTO), US Office Action in co-pending U.S. Appl. No. 17/735,245, filed May 3, 2022 having a date of mailing of May 18, 2023 (13 pgs.).
US Patent & Trademark Office, Non-Final Office Action issued in U.S. Appl. No. 18/103,774, having a Date of Mailing of Dec. 19, 2024 (7 pgs).
Pietila, Glenn, et al.: "Detection and Identification of Acoustic Signatures", Proc. 2011 NDIA Ground Vehicle Systems Engineering and Technology Symposium, 2011 (6 pgs).

\* cited by examiner

ACOUSTIC DETECTION OF CARGO MASS CHANGE

CROSS REFERENCE TO RELATED APPLICATIONS

This disclosure is a continuation-in-part of U.S. patent application Ser. No. 17/735,245 filed May 3, 2022, titled "ACOUSTIC FINGERPRINTING", having inventors: Matthew T. GERDES, Guang C. WANG, Timothy D. CLINE, and Kenny C. GROSS, and assigned to the present assignee, the entirety of which is incorporated herein by reference.

BACKGROUND

Criminal organizations use vehicles to smuggle illicit cargo such as drugs or persons into or out of sovereign territories. It is not practicable to have human personnel visually monitoring thousands of miles of coastline or other territorial boundaries in order to detect smuggling.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
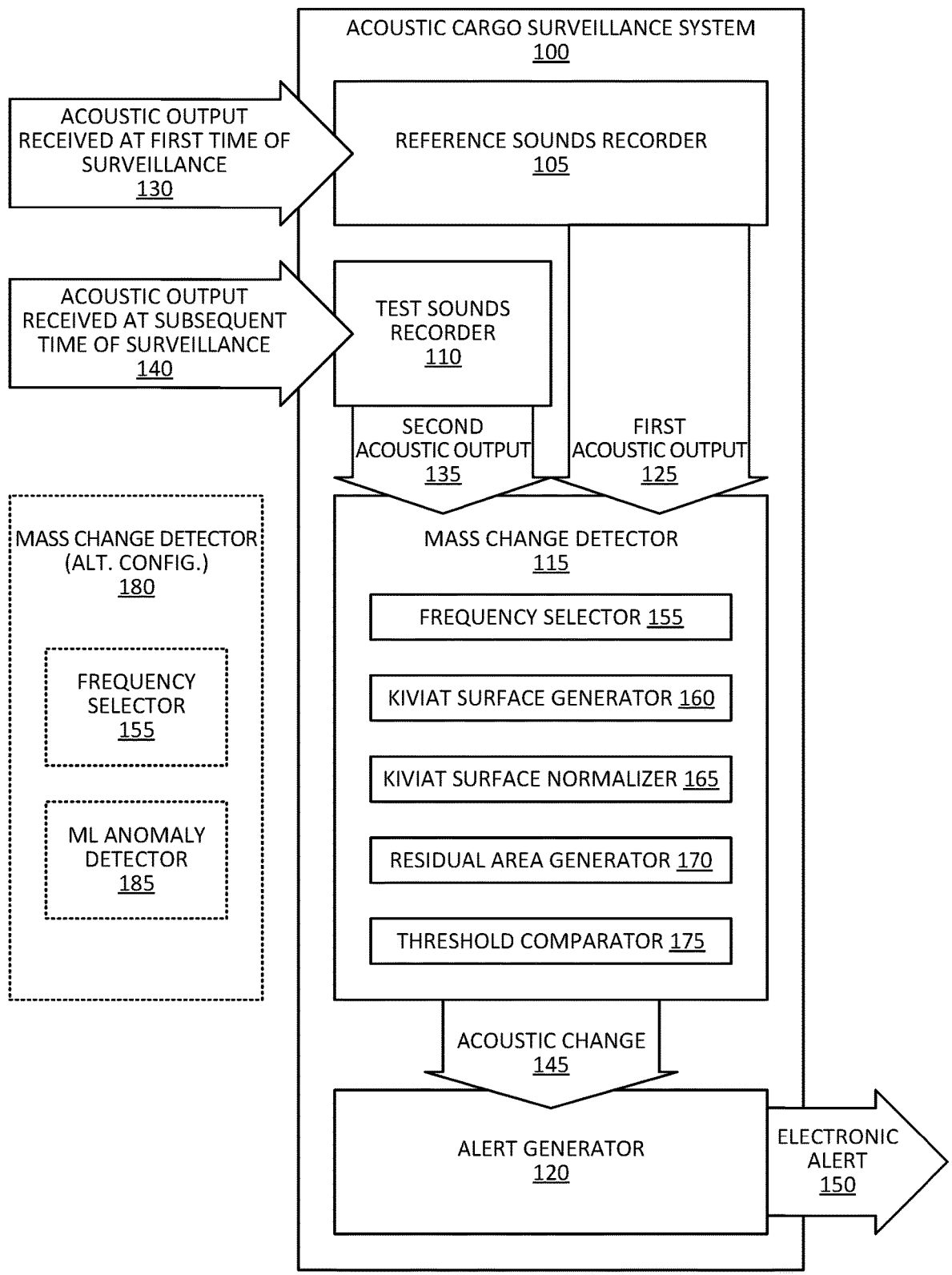
FIG. 1 illustrates one embodiment of an acoustic cargo surveillance system associated with acoustic detection of changes in cargo mass.

Systems, methods, and other embodiments are described herein that provide acoustic detection of changes in mass of cargo (also referred to herein as cargo mass) carried by a vehicle based on the acoustic output of the vehicle. In one embodiment, an acoustic cargo surveillance system compares acoustic output of the vehicle recorded at discrete times to determine whether a change in cargo mass has occurred. Acoustic detection of changes in cargo mass is highly useful, for example, in surveillance of vehicles used for smuggling or other illicit activities. For example, drug cartels and other criminal enterprises use vehicles such as small boats, helicopters, and airplanes to deliver illegal cargos such as drugs, weapons, cash, or persons. In one embodiment, acoustic cargo surveillance system can indicate that a delivery or pickup of cargo has occurred based on a step change in cargo mass.

Use of radar or lasers for surveillance of a target vehicle has a disadvantage of being active surveillance that involves directing detectable energy at the target vehicle, alerting operators of the target vehicle to the surveillance. Advantageously, in one embodiment, acoustic surveillance is passive, collecting sound wave vibrations emitted by operation of the target vehicle without directing energy at the target vehicle, as discussed in further detail herein. Use of radar or lasers for surveillance of a target vehicle is also unable to determine whether a delivery or pickup of cargo has occurred. Advantageously, in one embodiment, acoustic surveillance may be used to determine whether a delivery or pickup of cargo has occurred based on a change in mass, as discussed in further detail herein.

In one embodiment, the acoustic cargo surveillance system records the sounds given off by a vehicle carrying cargo at two discrete times. The acoustic cargo surveillance system then detects whether the mass of the cargo has changed based on a change in the sounds given off by the vehicle from one time to the other. Then, in response to detecting that the mass of the cargo has changed, the acoustic cargo surveillance system generates an electronic alert that the mass of the cargo has changed. The acoustic cargo surveillance system thus enables the detection of cargo pick-up or drop-off using undetectable, passive surveillance, thereby significantly improving the technology of surveillance and interdiction.

It should be understood that no action or function described or claimed herein is performed by the human mind, and cannot be practically performed in the human mind. An interpretation that any action or function described or claimed herein can be performed in the human mind is inconsistent with and contrary to this disclosure.

Definitions

As used herein, the term "Kiviat surface" refers to a two-dimensional shape defined in the plane of a Kiviat chart by values along the axes of the Kiviat chart. For example, a Kiviat surface may be a polygon bounded by lines between values on adjacent axes.

As used herein, the term "Kiviat chart" refers to a two-dimensional chart or diagram with three or more variables represented on axes radiating from a central point. In one embodiment, Kiviat chart used herein have equal angles between axes of the Kiviat chart.

As used herein, the term "time series" refers to a data structure in which a series of data points (such as observations or sampled values) are indexed in time order. In one embodiment, the data points of a time series may be indexed with an index such as a time stamp and/or an observation number. As used herein, the terms "time series signal" and "time series" are synonymous.

As used herein, the term "vector" refers to a data structure that includes a set of data points (such as observations or sampled values) from multiple time series at one particular index such as a time stamp and/or observations number.

As used herein, the term "time series database" refers to a data structure that includes one or more time series that share an index (such as a series of time stamps, positions, or observation numbers) in common. As an example, time series may be considered "columns" of a time series database, and vectors may be considered "rows" of a time series database.

As used herein, the term "residual" refers to a difference between a value (such as a measured, observed, sampled, or resampled value) and an estimate, reference, or prediction of what the value is expected to be. For example, a residual area between a reference Kiviat surface that shows what values are expected to be and a test Kiviat surface that shows what values actually are may be defined by the area between the boundaries of the reference and test Kiviat surfaces. Or for example, a residual may be defined by a difference between an ML estimate for a value and an actual, observed value. In one embodiment, the residual is a positive or negative value. In another embodiment, the residual is an absolute value or magnitude. In one embodiment, a time series of residuals refers to a time series made up of residual values between a time series of values and a time series of what the values are expected to be.

As used herein, the term "vehicle" refers to a self-propelled device for transporting persons or things. A vehicle may be, for example, a watercraft for transporting persons or things on or in water, such as a boat, ship, submarine, submersible, personal watercraft or jet-ski, or hovercraft. A vehicle may also be, for example, an aircraft for transporting persons or things by air, such as an airplane, helicopter, multi-copter (for example a quadcopter), autogiro or gyrocopter, ultralight, blimp, dirigible, or semi-rigid airship. A vehicle may also be, for example, a land craft for transporting persons or things over land, such as an automobile, a truck, a locomotive or train, a tank, or other motor vehicle for traveling over solid or semi-solid surfaces. In one embodiment, the test vehicle is a watercraft or an aircraft. In one embodiment, vehicles may be piloted or controlled by an operator on board the vehicle. In one embodiment, vehicles may be remotely operated or remote controlled by an operator away from the vehicle, such as in a drone aircraft. Vehicles may be autonomous or self-driving, where the operator is computer logic. Vehicles may be non-autonomous, where the operator is a person.

Example Acoustic Cargo Surveillance System

FIG. 1 illustrates one embodiment of an acoustic cargo surveillance system 100 associated with acoustic detection of changes in cargo mass. Acoustic cargo surveillance system 100 includes components for acoustically monitoring a vehicle (such as a boat or helicopter) for changes in cargo mass. Components of acoustic cargo surveillance system 100 may include a reference sounds recorder 105, a test sounds recorder 110, a mass change detector 115, and an alert generator 120. In one embodiment each of these components 105, 110, 115, and 120 of acoustic cargo surveillance system 100 may be implemented as software executed by computer hardware. For example, components 105, 110, 115, and 120 may be implemented as one or more intercommunicating software modules, routines, or services for performing the functions of the components described herein.

Reference sounds recorder 105 is configured to record a first acoustic output 125 of a vehicle carrying cargo at a first time of surveillance of the vehicle. In one embodiment, reference sounds recorder 105 is configured to store acoustic output received at the first time of surveillance 130 as the first acoustic output 125 in storage or memory for subsequent processing. Test sounds recorder 110 is configured to record a second acoustic output 135 of a vehicle carrying cargo at a subsequent time of surveillance of the vehicle. In one embodiment, test sounds recorder 110 is configured to store acoustic output received at the subsequent time of surveillance 140 as the second acoustic output 135 in storage or memory for subsequent processing. Mass change detector 115 is configured to acoustically detect a change in a mass of the cargo carried by the vehicle based at least on an acoustic change 145 between the first acoustic output 125 and the second acoustic output 135. Alert generator 120 is configured to generate an electronic alert 150 that the mass of the cargo has changed based on the acoustic change 145.

In one embodiment mass change detector 115 includes components for acoustically detecting a change in mass of the cargo based on the acoustic change. In one embodiment, mass change detector 115 includes a frequency selector 155 that is configured to identify and select a number of most informative component frequencies of the first acoustic output 125 to be axes for a reference Kiviat surface and a test Kiviat surface. In one embodiment, mass change detector 115 includes a Kiviat surface generator 160 that is configured to generate the reference Kiviat surface from the first acoustic output 125 and generate the test Kiviat surface from the second acoustic output 135. In one embodiment, mass change detector 115 includes a Kiviat surface normalizer 165 that is configured to normalize the reference Kiviat surface and the test Kiviat surface to a unit circle of the reference Kiviat surface before computing the residual area. In one embodiment, mass change detector 115 includes a residual area generator 170 that is configured to compute a residual area (representative of the acoustic change 145) between the normalized reference Kiviat surface and the normalized test Kiviat surface. In one embodiment, mass change detector 115 includes a threshold comparator 175 that is configured to determine of the residual area satisfies a threshold for identifying that a step-change in cargo mass has occurred.

In one embodiment, an alternate configuration of mass change detector 180 includes components for acoustically detecting a change in mass of the cargo based on the acoustic change using machine learning (ML). In one embodiment, as above, alternative configuration of mass change detector 180 includes frequency selector 155 that is configured to identify and select a number of most informative component frequencies of the first acoustic output 125. In one embodiment, alternative configuration of mass change detector 180 includes ML anomaly detector 185 that is configured to generate estimated values for the component frequencies from the second acoustic output 135; generate residual values from the estimated values and actual values for the component frequencies from the second acoustic output 135; and detect the residual values to be an anomalous acoustic change that indicates a change in cargo mass.

Further details regarding acoustic cargo surveillance system 100 are presented herein. In one embodiment, the operation of acoustic cargo surveillance system 100 will be described with reference to example acoustic cargo surveillance methods 200 and 300 shown in FIGS. 2 and 3. Examples of Kiviat surfaces and Kiviat tubes for showing whether cargo mass has changed will be described with reference to FIGS. 4, 5, and 6. An example graphical user interface for viewing electronic alerts of detection of cargo mass change will be described with reference to FIG. 7. In one embodiment, the operation of acoustic cargo surveillance system to confirm identity of a surveilled vehicle using acoustic fingerprints will be described with reference to example acoustic fingerprinting method 800.

Example Acoustic Cargo Surveillance Method

Figure 2:
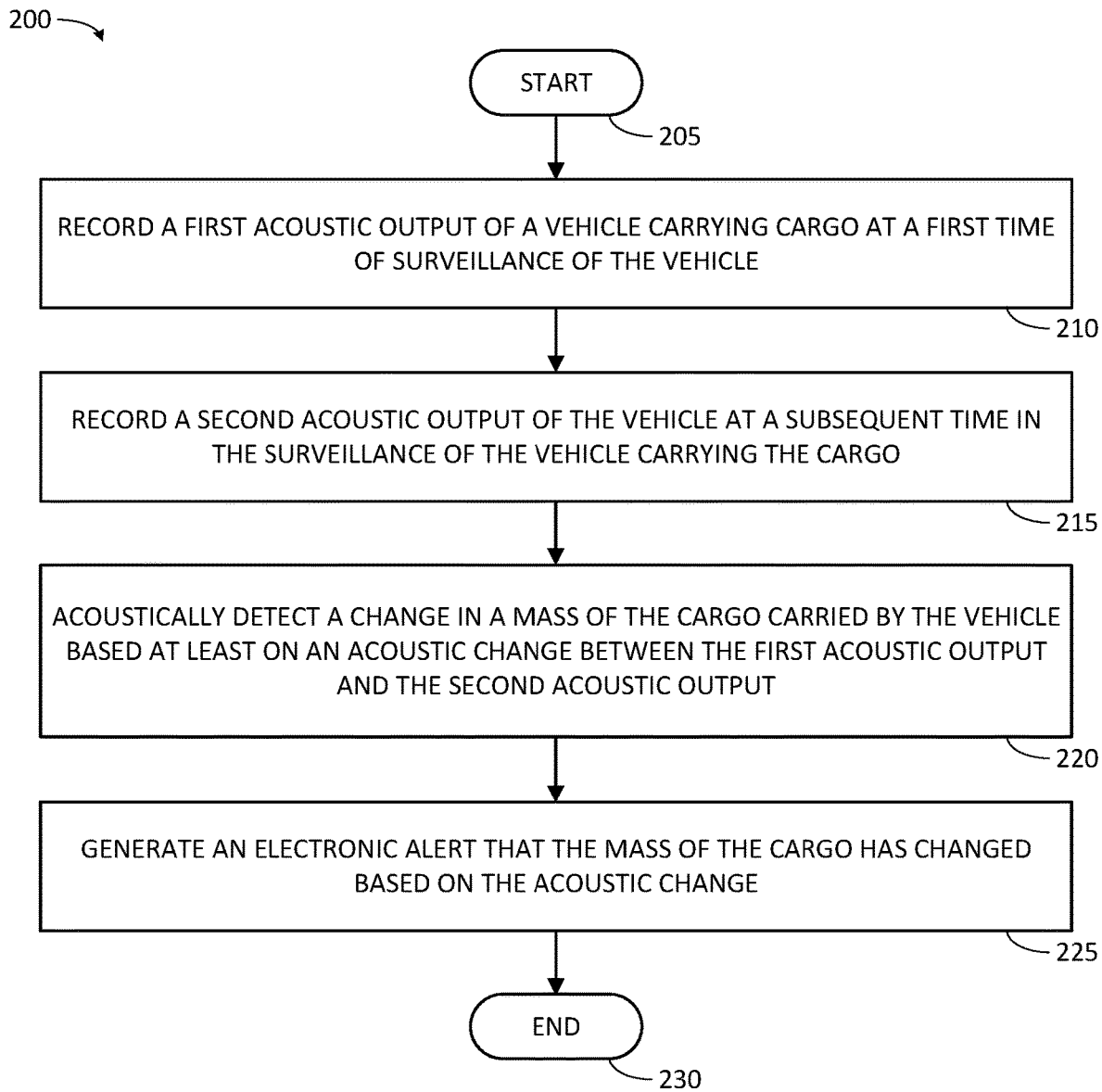
FIG. 2 illustrates one embodiment of an acoustic cargo surveillance method associated with acoustic detection of changes in cargo mass.

FIG. 2 illustrates one embodiment of an acoustic cargo surveillance method 200 associated with acoustic detection of changes in cargo mass. As an overview, in one embodiment, acoustic cargo surveillance method 200 records a first acoustic output of a vehicle carrying cargo at a first time of surveillance of the vehicle. Acoustic cargo surveillance method 200 also records a second acoustic output of the vehicle at a subsequent time in the surveillance of the vehicle carrying the cargo. Then, acoustic cargo surveillance method 200 acoustically detects a change in a mass of the cargo carried by the vehicle based at least on an acoustic change between the first acoustic output and the second acoustic output. Acoustic cargo surveillance method 200 generating an electronic alert that the mass of the cargo has changed based on the acoustic change.

In one embodiment, acoustic cargo surveillance method 200 initiates at START block 205 in response to an acoustic cargo surveillance system determining one or more of (i) an incoming stream of acoustic output of a vehicle has been detected; (ii) that an instruction to perform acoustic cargo surveillance method 200 on acoustic output of a vehicle has been received (iii) a user or administrator of acoustic cargo surveillance system 100 has initiated acoustic cargo surveillance method 200; (iv) it is currently a time at which acoustic cargo surveillance method 200 is scheduled to be run; or (v) that acoustic cargo surveillance method 200 should commence in response to occurrence of some other condition. In one embodiment, a computer configured by computer-executable instructions to execute functions of acoustic cargo surveillance system 100 executes acoustic cargo surveillance method 200. Following initiation at start block 205, acoustic cargo surveillance method 200 continues to process block 210.

Example Acoustic Cargo Surveillance Method—Recording Reference Output

At process block 210, acoustic cargo surveillance method 200 records a first acoustic output of a vehicle carrying cargo at a first time of surveillance of the vehicle. The sound generated by the vehicle while carrying cargo is collected and stored for later reference and comparison.

The acoustic output of a vehicle is sound or vibration produced by powered operation of the vehicle. During powered operation, engines, motors, drive shafts, and other components emit (or cause the vehicle to emit) acoustic output. The acoustic output of the vehicle includes sounds that are influenced by a mass of the cargo carried by the vehicle. As used herein, cargo is a general term that refers to physical objects such as persons or goods carried by a vehicle. The mass of the cargo may increase as goods or persons arrive aboard the vehicle, and may decrease as goods or persons leave the vehicle. The cargo is carried by the vehicle during powered operation of the vehicle. Cargo is carried by a vehicle when the cargo is supported and moved by the vehicle.

The acoustic output of the vehicle may be detected, sensed, measured, scanned, or otherwise received by acoustic transducers such as directional microphones. In one embodiment, the received acoustic output covers a spectrum of frequencies detectable by the acoustic transducers. In one embodiment, the spectrum of frequencies approximately covers the range of human hearing, for example from 20 Hz to 20,000 Hz. In one embodiment, the spectrum of frequencies may extend below the range of human hearing into infrasound frequencies. In one embodiment, the spectrum of frequencies may extend above the range of human hearing into ultrasound frequencies.

In one embodiment, the acoustic output of the vehicle that is received by acoustic transducers may be characterized by a spectrum analyzer. The spectrum analyzer takes the raw electronic signals from the acoustic transducers sensing the acoustic output and converts the electronic signals into a computer-readable representation of the acoustic output. The acoustic output is represented over the spectrum of frequencies at a fine frequency resolution pre-selected for the spectrum analyzer. The computer-readable representation of the acoustic output is stored for subsequent analysis. In one embodiment, the computer-readable representation of the acoustic output is stored as a time series of sets of amplitude values for each individual fine frequency in the spectrum of frequencies. The time series may be stored by writing it to memory or storage.

The acoustic output of the vehicle may thus be recorded at a first, initial time of surveillance. The initial surveillance period records sound (acoustic output) of the vehicle in an initial configuration. In the initial configuration, the vehicle carries an initial mass or load of cargo. In one embodiment, the initial surveillance period may extend over multiple seconds or minutes, in which the acoustic output produced by powered operation of the vehicle is received by acoustic transducers. In one embodiment, the acoustic output is received with little or no interruption during the surveillance period. In one embodiment, gaps in the acoustic output when the vehicle was unpowered, or when the acoustic transducers failed to collect sound from the vehicle may be discarded from the initial surveillance. The acoustic output recorded during the initial surveillance period establishes a baseline of acoustic output for the vehicle, which may be used as a reference to detect changes in cargo mass in subsequent surveillance of the vehicle. The initial configuration of the vehicle, in which the vehicle is carrying the initial cargo mass, may also be referred to herein as a reference vehicle.

Thus, in one embodiment, acoustic cargo surveillance method 200 records a first acoustic output of a vehicle carrying cargo at a first time of surveillance of the vehicle by receiving sounds generated by powered operation of the vehicle while carrying an initial cargo load, characterizing the sounds as amplitude values per individual frequency over time, and storing the characterized sounds. Additional detail on recording a first acoustic output of a vehicle carrying cargo at a first time of surveillance of the vehicle is provided herein, for example with reference to process block 310 of acoustic cargo surveillance method 300. Process block 210 then completes, and acoustic cargo surveillance method 200 continues at process block 215. In one embodiment, the functions of process block 215 are performed by reference sounds recorder 105. At the conclusion of process block 210, acoustic output of the vessel while it is carrying an initial baseline load of cargo has been stored for subsequent reference. Changes in acoustic output of the vehicle away from the stored acoustic output can be indicative of a change in cargo mass.

Example Acoustic Cargo Surveillance Method—Recording Test Output

At process block 215, acoustic cargo surveillance method 200 records a second acoustic output of the vehicle at a subsequent time in the surveillance of the vehicle carrying the cargo. The sound generated by the vehicle in a later surveillance period during which it is possible for the mass of cargo to change is collected. This second acoustic output may be used for comparison with the first acoustic output generated by the vehicle carrying the initial mass of cargo.

In one embodiment, the second acoustic output is produced during ongoing surveillance of the vehicle. The ongoing surveillance follows the initial surveillance period in which the vehicle carries the initial cargo mass. During the ongoing surveillance period, it is possible that the mass of the cargo carried by the vehicle may undergo a change. For example, a person may enter or leave the vehicle, or goods may be dropped off or picked up by the vehicle. Or, for example, cargo may be thrown overboard to discard evidence. These actions change the configuration of the vessel from a first, initial configuration to a second, changed configuration. During the ongoing surveillance period, in which the vehicle may carry cargo masses which differ from the initial cargo mass, the vehicle may also be referred to herein as a test vehicle.

The acoustic output of the vehicle may change in response to the change in the mass of the cargo. The change in acoustic output may be due to increased or decreased effort by the engine or motor of the vehicle. Thus, the change in the acoustic output of the vehicle may be recorded in in the second acoustic output, capturing sounds that indicate that the mass of cargo has changed. Or, the lack of change in the acoustic output of the vehicle may be recorded in the acoustic output, capturing sounds that indicate that the mass of cargo has not changed.

In one embodiment, the second acoustic output of the vehicle is recorded in a manner similar to that described at process block 210 for the first acoustic output. For example, the acoustic output of the vehicle produced by powered operation of the vehicle during the subsequent surveillance period are received by transducers, characterized as amplitudes per frequency by a spectrum analyzer, and written to memory or storage as sets of amplitudes per frequency for a given time. In one embodiment, the sets of amplitudes per frequency are produced as a live, real-time stream to be made available for immediate analysis at process block 220 below. As used herein, the terms "stream" and "streaming" refer to transmittal, use, and receipt of data as a continual flow (for example, with data points arriving at a sampling rate), allowing use of portions of the data to occur while the data is being received.

Process block 215 then completes, and acoustic cargo surveillance method 200 continues at process block 220. In one embodiment, the functions of process block 215 are performed by test sounds recorder 110. At the completion of process block 215, acoustic output of the vehicle that indicates whether or not the mass of cargo has changed has been recorded.

Example Acoustic Cargo Surveillance Method—Detecting Mass Change

At process block 220, acoustic cargo surveillance method 200 acoustically detects a change in a mass of the cargo carried by the vehicle based at least on an acoustic change between the first acoustic output and the second acoustic output. For example, acoustic cargo surveillance method 200 may detect a change in the sounds emitted by the vehicle that is sufficiently large to indicate a change in cargo mass.

The change in mass of the cargo carried by the vehicle is a change away from the initial mass of cargo represented by the first acoustic output of the vehicle. The acoustic detection of a change in mass is carried out based on the first and second acoustic outputs passively recorded from the vehicle. In particular, the acoustic detection of a change in cargo mass is based on an acoustic change between first acoustic output and second acoustic output. The change in acoustic output is detected by comparing Kiviat surfaces for the first acoustic output and second acoustic output to determine whether the areas of the Kiviat surfaces differ sufficiently to indicate that the mass of cargo carried by the vehicle has changed from the initial mass. The Kiviat surfaces are defined by amplitudes of acoustic output at a set of component frequencies of the acoustic output.

In one embodiment, as an initial step, acoustic cargo surveillance method 200 selects a number or set of most informative component frequencies of the first acoustic output to be axes for a reference Kiviat surface (to be generated from the first acoustic output) and a test Kiviat surface (to be generated from the second acoustic output). In one embodiment, the recorded first acoustic output from the vehicle undergoes a bivariate frequency-domain to time-domain transformation that separates the acoustic output into ranges of frequencies referred to as frequency bins, and sequentially samples component frequencies that are representative of the frequency bins to produce time series signals for the frequency bins.

In one embodiment, the frequency bins are contiguous ranges of the frequency spectrum. In one embodiment, the frequency bins are discrete and do not overlap. In one embodiment, the frequency bins partition the fine frequencies generated by the spectrum analyzer into the bins. In one embodiment, the frequency bins are of approximately equal width, covering similar ranges of the frequency spectrum. In one embodiment, frequency bin is represented by one component frequency within the frequency bin. This component frequency may be referred to as the representative frequency for the bin. In one embodiment, the representative frequency is a frequency on which the bin is centered, at a mid-point of the range covered by the bin. In one embodiment, the representative frequency is a frequency among those within the bin that has highest peaks or that has greatest changes in amplitude. In one embodiment, the representative frequency is an aggregate frequency, such as an average (mean or median) of fine frequency values across the frequency range of the frequency bin.

The frequency bins and their representative frequencies may be considered to be "coarse" frequencies because multiple fine frequencies are included in a frequency bin. For example, in one embodiment, the frequency spectrum may be divided into 100 bins (although higher or lower numbers of bins may be used). Thus, in an acoustic spectrum ranging from 20 Hz to 20,000 Hz, a frequency bin that is one one-hundredth (0.01) of the width of the spectrum is approximately 200 (199.8) Hz wide. In one embodiment, as discussed below, the frequency range of the first acoustic output and second acoustic output is divided into 100 bins.

In one embodiment, the set of component frequencies selected for sampling are those that are most informative—that is, most information bearing—about the operation of the vehicle. In one embodiment, the most informative component frequencies that best characterize operation of the vehicle are automatically identified. Time series signals generated from these most informative component frequencies are used to form sequences of Kiviat surfaces for the first acoustic output and second acoustic output.

In one embodiment, the most informative component frequencies of the first acoustic output are identified based on a power spectral density (PSD) analysis of the representative frequencies. In one embodiment, a PSD curve is generated for each representative frequency. The PSD curve for a representative frequency may be calculated by performing a fast Fourier transform on a time series signal sampled from the representative frequency.

In one embodiment, the change in cargo mass can be detected regardless of throttle speed for the vehicle. Peaks in the PSD curve are dominated by repetitive or cyclic output, such as motor/engine or other drive-train noise of the vehicle. Thus, the motor, engine, drivetrain, or other cyclic noises made by operating the device appear as peaks in the PSD curves. Thus, the exact rotational speed (for example, RPM) of the motor(s) of the vehicle are known. The motors work harder for a given rotational speed when moving heaver cargo loads, producing louder, higher-amplitude acoustic outputs. And motors work less hard for the given rotational speed when moving lighter cargo loads, producing quieter, lower-amplitude acoustic outputs. Those representative frequencies having the highest peaks in the PSD curve thus carry the most information—sounds produced by operation of the device—and are therefore the most informative. In one embodiment, a step-change in intensity at a motor rotational frequency may indicate a change in cargo mass.

In one embodiment, the frequency bins are ranked by peak height of the PSD curves for the representative frequency of the bins. In one embodiment, the set of bins whose representative frequencies have the highest PSD peaks are automatically selected to be used to form Kiviat surfaces. In one embodiment, the top N bins are selected to be axes of Kiviat charts used to form the Kiviat surfaces. In one embodiment, the number of most informative component frequencies N is approximately 20. 20 signals sampled from these component frequencies strikes a satisfactory balance between compute costs and accuracy in detection of changes in cargo mass. Additional detail about the selection of the set of component frequencies is provided below with reference to process blocks 315 and 320 of method 300. In one embodiment, the functions described herein for selecting the most informative frequencies are performed by frequency selector 155.

Time series signals are generated from the top N bins by sampling the amplitude of the representative frequency of the bin at an interval (such as one second). In this way, the most informative acoustic time-series signals may be extracted from a database of measurements spanning a wide band of acoustic frequencies.

In one embodiment, acoustic cargo surveillance method 200 then generates a reference Kiviat surface from the first acoustic output, and generates a test Kiviat surface from the second acoustic output. The reference Kiviat surface and test Kiviat surface are generated based on the amplitudes of the selected component frequencies of the first acoustic output and second acoustic output, respectively, at a shared point in time.

In one embodiment, the first acoustic output is represented as a first time series database having time series signals of amplitude sampled at the top N bins from the first acoustic output at an interval. And, the second acoustic output is represented as a second time series database having time series signals of amplitude sampled at the top N bins from the second acoustic output at the interval. In one embodiment, the top N bins used for sampling are one same, common, or shared set of top N bins for sampling both the first acoustic output and the second acoustic output. In one embodiment, the top N bins are selected based on the first acoustic output (of the reference vehicle) and used for sampling both the first acoustic output and the second acoustic output. A set of top bins selected based on the first acoustic output is expected to differ from another set of top bins selected based on the second acoustic output, and therefore the respective top N bins for the first acoustic output and second acoustic output are not both used for sampling. Note that in one embodiment, the test database may be provided as a live stream of time series vectors (or observations) from the acoustic transducers and spectrum analyzer.

In one embodiment, a vector (or observation) of acoustic output includes an amplitude value for each of the representative frequencies at the point in time of the observation. A vector for a point in time is retrieved from both the first acoustic output and the second acoustic output. In particular, the vectors may be retrieved from the first time series database and second time series database, which respectively represent the first acoustic output and second acoustic output using the representative frequencies.

The amplitude values in the retrieved vectors are used to generate reference and test Kiviat surfaces for the point in time. In one embodiment, to generate the Kiviat surfaces, the amplitude values are plotted as points on axes for the representative frequencies in a Kiviat chart, and adjacent points are connected to form the border or outline that defines the Kiviat surface. Additional detail regarding the generation of the Kiviat surfaces is provided below, for example with reference to process blocks 340 and 350 of acoustic cargo surveillance method 300. In one embodiment, the functions described herein for generating Kiviat surfaces are performed by Kiviat surface generator 160.

Once the reference Kiviat surface and test Kiviat surfaces for the point in time are generated, in one embodiment, the reference Kiviat surface and test Kiviat surface are normalized. In one embodiment, the reference Kiviat surface and test Kiviat surface are both normalized to a unit circle of the reference Kiviat surface. In other words, the amplitude values on the frequency axes for the reference Kiviat surface are multiplied by a set of coefficients to cause the border of the normalized reference surface to be a unit circle (or unit N-sided polygon). In the set of coefficients, there is one coefficient assigned to each of the N frequency axes. The amplitude values on the frequency axes for the test Kiviat surface are also multiplied by the coefficients assigned to the frequency axes. The test Kiviat surface is thus normalized to the unit circle of the reference Kiviat surface. Note that the border of the normalized test Kiviat surface does not generally align with the unit-circle-shaped border of the reference Kiviat surface. Additional detail regarding normalizing the reference Kiviat surface and test Kiviat surface to a unit circle of the reference Kiviat surface is discussed herein with reference to process block 360 of acoustic cargo surveillance method 300. In one embodiment, the functions described herein for normalizing Kiviat surfaces are performed by Kiviat surface normalizer 165.

Once the reference Kiviat surface and the test Kiviat surface are thus normalized, in one embodiment, acoustic cargo surveillance method 200 computes a residual area between the reference Kiviat surface and the test Kiviat surface. This residual area represents the acoustic change. In one embodiment, the residual area is the area defined between the borders of the normalized reference Kiviat surface (or unit circle) and the normalized test Kiviat surface. The residual area represents a cumulative error across the selected most informative frequencies (the axes of the Kiviat chart) for a single time step or point in time.

The residual area is an absolute area, such that regions defined between the borders of the normalized reference Kiviat surface and the normalized test Kiviat surface are positive, and do not subtract from each other even where the borders cross over each other. The residual area may be generated by calculating the areas of all the regions or shapes defined between the borders of the normalized reference Kiviat surface and the normalized test Kiviat surface, and summing the calculated areas. The residual between the normalized reference Kiviat surface and the normalized test Kiviat surface may be referred to herein as an annular residual. Additional detail regarding computing a residual area between the reference Kiviat surface and the test Kiviat surface is discussed herein with reference to process block 365 of acoustic cargo surveillance method 300. In one embodiment, the functions described herein for computing a residual area are performed by residual area generator 170.

As mentioned above, the residual area represents the acoustic change. In particular, the residual area represents a magnitude of change in the acoustic output of the vehicle from the first acoustic output generated when carrying the initial mass of cargo, and the second acoustic output generated when carrying a potentially differing mass of cargo while under ongoing surveillance. The acoustic change from the first acoustic output to the second acoustic output is minimal where there is no change in cargo mass. The acoustic change from the first acoustic output to the second acoustic output is more pronounced where there is a change in cargo mass. Thus, a change in cargo mass may be detected acoustically where the acoustic change between the first acoustic output and the second acoustic output is so pronounced as to indicate a change of mass of the cargo.

A threshold level of magnitude of acoustic change (or threshold area) may be set that defines where the acoustic change is indicative of a change of cargo mass. In one embodiment, this threshold level of magnitude may be defined as a ratio of the area of the normalized reference Kiviat surface (or unit circle). In one embodiment, the threshold may be provided or set by a user or administrator of acoustic cargo surveillance system 100. For example, the threshold area may be set by a user at 5% of the area of the normalized reference Kiviat surface. Lower threshold areas increase sensitivity to cargo mass changes and enables detection of smaller changes in cargo mass, and may increase false alerts and decrease missed alerts. Higher threshold areas decrease sensitivity to cargo mass changes, requiring larger changes in cargo mass for detection, and may decrease false alerts and increase missed alerts. In one embodiment, the user may select a threshold area that is tailored to detect an illicit cargo the vessel is suspected of carrying. For example, higher threshold areas for drop-off or pick-up of persons in suspected human trafficking or illegal entry, lower thresholds for drop-off or pick-up of cash or uncut drugs.

Where the residual area between the borders of the normalized reference Kiviat surface and the normalized test Kiviat surface is below the threshold area, the threshold for finding a change of cargo mass is unsatisfied, and no change of cargo mass is detected. And, where the residual area between the borders of the normalized reference Kiviat surface and the normalized test Kiviat surface is above (or equal to) the threshold area, the threshold for finding a change of cargo mass is satisfied, and a change of cargo mass is detected.

Thus, in one embodiment, acoustic cargo surveillance method 200 acoustically detects a change in a mass of the cargo carried by the vehicle as follows: Component frequencies that carry the most information about powered operation of the vehicle are identified. The identified component frequencies are selected to be axes for a reference Kiviat chart and a test Kiviat chart. Amplitude values for the identified frequencies in the first acoustic output at a time are plotted onto the reference Kiviat chart as points on the axes. Amplitude values for the identified frequencies in the second acoustic output at the time are plotted onto the test Kiviat chart as points on the axes. Points on adjacent axes are connected with lines to form borders or outlines that define the reference Kiviat surface and test Kiviat surface. The reference Kiviat surface and test Kiviat surface are normalized by multiplying each amplitude value on an axis of the reference Kiviat chart and the test Kiviat chart by a coefficient that causes the amplitude value on the axis of the reference Kiviat chart to have a unit value. A residual area (which represents the acoustic change) between the reference Kiviat surface and the test Kiviat surface is determined by summing the areas between the borders that define the reference Kiviat surface and the test Kiviat surface. The residual area is compared to a threshold that indicates whether a change in cargo mass is indicated by the acoustic change represented by the residual area.

In one embodiment, the functions of process block 220 are performed by mass change detector 115, including frequency selector 155, Kiviat surface generator 160, Kiviat surface normalizer 165, and residual area generator 170.

In another embodiment, a multivariate machine learning (ML) model is trained to generate estimates of what amplitude values of selected (most informative) component frequencies are expected to be given no change in vehicle configuration away from an initial cargo mass has occurred. In one embodiment the multivariate ML model is trained using time series signals sampled from the selected component frequencies of the first acoustic output (which represents vehicle operation while carrying the initial cargo mass). The time series signals for the component frequencies are the input variables of the multivariate ML model. During training of the multivariate ML model, parameters of a function of the ML model are iteratively adjusted towards producing estimated amplitude values for the component frequencies that approximate actual amplitude values for the component frequencies until the multivariate ML model consistently produces estimated values that satisfactorily approximate the actual values.

In one embodiment, the multivariate ML model is implemented as one or more non-linear non-parametric (NLNP) regression algorithms used for multivariate pattern recognition or anomaly detection. These ML anomaly detection algorithms may include neural networks (such as long short-term memory (LSTM) networks), support vector machines (SVMs), auto-associative kernel regression (AAKR), and similarity-based modeling (SBM) such as the multivariate state estimation technique (MSET). Thus, in one embodiment, the multivariate ML model is a NLNP model or an MSET model.

In one embodiment, the trained multivariate ML model is used to produce estimates of time series signals sampled from the selected component frequencies of the second acoustic output (which represents vehicle operation during ongoing surveillance). The trained multivariate ML model produces estimates of what the amplitude values of the selected component frequencies of the second acoustic output are expected to be given that no change away from the initial cargo mass has occurred.

Residuals between the estimated and actual amplitude values for the selected component frequencies of the second acoustic output are generated. The residuals may be generated as a time series of residuals for each of the selected component frequencies. The set of time series of residuals for the selected component frequencies may be analyzed with an anomaly detection test to determine whether the actual amplitude values for the selected component frequencies in the second acoustic output are anomalous. The results of the anomaly detection test show whether or not a change in cargo mass is indicated by an acoustic change between the first acoustic output and the second acoustic output. Anomalous values indicate a change in the mass of the cargo carried by the test (surveilled) vehicle. In one embodiment, the test for detection of an anomaly is the sequential probability ratio test (SPRT). The SPRT calculates a cumulative sum of the log-likelihood ratio for each successive residual between an actual value for a signal and an estimated value for the signal, and compares the cumulative sum against a threshold value indicating anomalous deviation. Where the threshold is crossed, an anomalous acoustic change that indicates a change in cargo mass is detected.

In another embodiment, the acoustic cargo surveillance method 200 acoustically detects a change in a mass of the cargo carried by the vehicle by identifying component frequencies that carry the most information about powered operation of the vehicle; selecting the identified component frequencies; generating estimated values for the component frequencies using an ML model; generating residuals between actual values and the estimated values; detecting that the residuals are anomalous; and indicating that an acoustic change indicative of a change in mass has been detected. In one embodiment, the functions of process block 220 are performed by alternate configuration of mass change detector 180, In particular, the training of the multivariate ML model, the generation of estimates and residuals, and the anomaly detection test are executed by ML anomaly detector 185.

Process block 220 then completes, and acoustic cargo surveillance method 200 continues at process block 225. At the completion of process block 220, acoustic cargo surveillance method 200 has determined that the mass of the cargo has (or has not) changed away from the initial cargo mass based on a change in acoustic output from the vehicle. This determination of an acoustic change is made based on an analysis of the most informative component frequencies of acoustic output. The determination of acoustic change can be used to trigger generation of an electronic alert.

Example Acoustic Cargo Surveillance Method—Alert Generation

At process block 225, acoustic cargo surveillance method 200 generates an electronic alert that the mass of the cargo has changed based on the acoustic change. In one embodiment, when the area of the residual between the reference Kiviat surface and the test Kiviat surface is sufficiently large to indicate a change in cargo mass, an electronic alert message is created to indicate detection of the change in cargo mass. Or, in one embodiment, when the residuals between the estimated and actual values for the most-informative component frequencies in the second acoustic output are determined to be anomalous, an electronic alert message is created to indicate detection of the change in cargo mass. The electronic alert may be used to inform a user of the acoustic cargo surveillance system or a computing system about the detected change in cargo mass.

In one embodiment, the electronic alert is generated by composing and transmitting a computer-readable message including content describing the detected change in cargo mass. In one embodiment, the electronic alert includes an indication that a change in mass of the cargo has been detected. In one embodiment, the electronic alert includes area of the residual between the normalized reference Kiviat surface and the normalized test Kiviat surface. In one embodiment, the electronic alert includes a Kiviat chart on which the residual between the normalized reference Kiviat surface and the normalized test Kiviat surface is plotted. In one embodiment, the electronic alert includes a Kiviat chart on which the reference Kiviat surface is plotted. In one embodiment, the electronic alert includes a Kiviat chart on which the test Kiviat surface is plotted.

In one embodiment, the electronic alert includes an indication of a time at which a change in mass of cargo has been detected. (The time at which the change in mass of cargo has been detected may be referred to herein as a "time of detection".) The time may be indicated, for example, as elapsed time from commencement of acoustic surveillance, or for example, as a clock time at which the change in mass of cargo has been detected.

In one embodiment, the residual between the normalized Kiviat surfaces, the reference Kiviat surface, and the test Kiviat surface are for the time of detection. In one embodiment, the electronic alert includes a reference Kiviat tube made up of reference Kiviat surfaces. In one embodiment, a position of the reference Kiviat surface for the time of detection may be indicated in the reference Kiviat tube. In one embodiment, the electronic alert includes a test Kiviat tube made up of test Kiviat surfaces. In one embodiment, a position of the test Kiviat surface for the time of detection may be indicated in the reference Kiviat tube. For example, the position of the reference or test Kiviat surface may be indicated by using one or more of colors, lines, line weights, callouts or labels, arrows, pointers, or other visible indicators that distinguish the Kiviat surface for the time of detection from Kiviat surfaces for preceding or subsequent times in a Kiviat tube.

In one embodiment, the electronic alert includes an identifier for the vehicle that is under acoustic surveillance. In one embodiment, the electronic alert includes location information such GPS coordinates, latitude and longitude, triangulated location, or other location descriptions for the vehicle under surveillance and/or the acoustic transducers used for passive surveillance of the vehicle.

In one embodiment, an electronic alert may be generated and sent in response to an initial detection of a change in cargo mass of the vessel. In one embodiment, a continual stream of electronic alerts may be generated and sent beginning with the initial detection of the change in cargo mass and continuing with subsequent detections of the change in cargo mass.

The results of the threshold comparison or anomaly detection test of process block 220 are checked to determine whether the electronic alert should be generated. In response to the threshold being satisfied or anomaly being detected, process block 225 executes and the electronic alert is generated. In one embodiment, in response to the threshold not being satisfied or no anomaly being detected, process block 225 is bypassed and no electronic alert is generated. In one embodiment, in response to the threshold not being satisfied an alternative electronic message indicating that no change in mass has been detected may also be composed and transmitted. In one embodiment, the alternative electronic message may include similar information to that described above for inclusion in the electronic alert.

The electronic alert may be composed and then transmitted for subsequent presentation on a display or other action. The electronic alert may be configured to be presented by display in a graphical user interface (GUI). Further detail regarding display of the electronic alert in a GUI is discussed below with reference to FIG. 7.

In one embodiment, the electronic alert is a message that is configured to be transmitted over a network, such as a wired network, a cellular telephone network, wi-fi network, or other communications infrastructure. The electronic alert may be configured to be read by a computing device. The electronic alert may be configured as a request (such as a REST request) used to trigger initiation of a function. The electronic alert may be presented by extracting the content of the electronic alert by a REST API that has received the electronic alert. In one embodiment, the electronic alert is transmitted in order to initiate an interdiction response. A dispatch system may be configured to automatically dispatch enforcement agency personnel and/or equipment to the location of the vessel, or to the location of the cargo drop-off or pick-up.

In one embodiment, the acoustic detection of the change in cargo mass and generation of the electronic alert may be performed at a later period in time in one or more batches. In one embodiment, the acoustic detection of the change in cargo mass and generation of the electronic alert may be completed live, in real-time (or near real-time) so as to present the electronic alert at a time substantially immediately following receipt of acoustic output that indicates the change in mass of cargo. In one embodiment, as used herein "real-time" refers to substantially immediate operation that keeps pace with a throughput of a stream of data. In one embodiment, real-time operations are subject only to a minimal delay or latency that is acceptable in the context of live surveillance of a vehicle. For example, substantially immediate real-time operation of acoustic cargo surveillance method 200, availability of the electronic alert is subject to a minimal delay or latency between receiving second acoustic output indicative of a cargo mass change and transmission of electronic alert that the cargo mass change has been detected. In one embodiment, the latency between receiving second acoustic output indicative of a cargo mass change and transmission of electronic alert that the cargo mass change has been detected is less than a sampling interval (such as one second) for recording the second acoustic output.

Thus, in one embodiment, in response to the acoustic change satisfying the threshold for detection of a cargo mass change, the acoustic cargo surveillance method 200 generates an electronic alert that generates an electronic alert that the mass of the cargo has changed based on the acoustic change by composing an electronic message that describes a change in cargo mass, and transmitting the electronic message for display or for initiation of an interdiction response. In one embodiment, the functions of process block 225 are performed by alert generator 120. Process block 225 then completes, and continues to END block 230 where acoustic cargo surveillance method 200 concludes.

In one embodiment, one or more steps of acoustic cargo surveillance method 200 (or other methods herein) are performed as a streaming workflow that processes acoustic output received at subsequent times of surveillance as they are received from the vehicle. In one embodiment, steps 215 through 225 of method 200 may be repeated in a loop for a stream of second (test) acoustic outputs received from the vehicle. In one embodiment, the processing of steps 215 through 225 may be performed live, in real-time, for rapid, early, and accurate detection of a change in cargo mass. In one embodiment, a live stream of test acoustic outputs may be surveilled in real-time to detect a change in cargo mass from an initial cargo mass.

Thus, at the conclusion of acoustic cargo surveillance method 200, a drop-off or pick-up of goods or persons by a vehicle has been detected entirely passively using acoustic surveillance. Enforcement authorities may be informed of the occurrence of the cargo drop-off or pick-up to store as evidence in an investigation, to cause an interdiction response to seize illicit cargos and/or criminal actors to be performed on the vehicle, or at the location where the cargo drop-off or pick-up occurred.

—Further Embodiments of Acoustic Cargo Surveillance Method—

In one embodiment, the acoustic change is represented by a difference in area (or residual area) between a reference Kiviat surface that represents the first acoustic output and a test Kiviat surface that represents the second acoustic output. In one embodiment of process block 215, the acoustic change is determined by generating a reference Kiviat surface from the first acoustic output and generating a test Kiviat surface from the second acoustic output, followed by computing a residual area between the reference Kiviat surface and the test Kiviat surface. The residual area represents the acoustic change.

In one embodiment, the reference Kiviat surface and test Kiviat surface are normalized by multiplying the values on each corresponding pair of axes from the reference Kiviat surface and test Kiviat surface by a factor that causes the value on the axis from the reference Kiviat surface to be one. The factor may differ for each axis, and cause the reference Kiviat surface to represent a unit circle as a unit polygon. Thus, in one embodiment of process block 215, computing the residual area further includes normalizing the reference Kiviat surface and the test Kiviat surface to a unit circle of the reference Kiviat surface before computing the residual area.

In one embodiment, the acoustic change used for detecting a change in mass of cargo is a change in one or more of a set of component frequencies of the first acoustic output and second acoustic output. In one embodiment, these component frequencies are represented by axes of the reference and test Kiviat surfaces. For example, the Kiviat surfaces are described by values along axes that represent the values of the component frequencies in the first acoustic output and second acoustic output. Thus, in one embodiment, computing the residual area as described in process block 215 may further include steps of identifying and selecting component frequencies to be the axes of the reference and test Kiviat surfaces. In one embodiment, acoustic cargo surveillance method 200 identifies a set of most informative component frequencies of the first acoustic output. Then, acoustic cargo surveillance method 200 selects the most informative component frequencies to be axes for the reference Kiviat surface and the test Kiviat surface.

In one embodiment, determining the acoustic change as described with reference to process block 215 selecting the frequencies, generating reference and test Kiviat surfaces based on the selected frequencies, normalizing Kiviat surfaces, and computing a residual area to represent the acoustic change. Acoustic cargo surveillance method 200 selects a number of component frequencies of the first acoustic output that are most informative (bearing the most information) about operation of the vehicle to be axes for a reference Kiviat surface and a test Kiviat surface. Acoustic cargo surveillance method 200 then generates the reference Kiviat surface from the first acoustic output and generates the test Kiviat surface from the second acoustic output. Acoustic cargo surveillance method 200 normalizes the reference Kiviat surface and the test Kiviat surface to a unit circle of the reference Kiviat surface. Acoustic cargo surveillance method 200 computes a residual area between the reference Kiviat surface and the test Kiviat surface, wherein the residual area represents the acoustic change.

In one embodiment, determining the acoustic change as described with reference to process block 215 employs a machine learning model. In one embodiment, a machine learning model is used to detect an acoustic change that indicates a change in cargo mass. Thus, in one embodiment, acoustic cargo surveillance method 200 selects component frequencies of the first acoustic output that are most informative about operation of the vehicle. Acoustic cargo surveillance method 200 generates estimated values for the component frequencies from the second acoustic output using a machine learning model. The machine learning model has been trained to generate the estimated values to be consistent with no change in cargo mass. Acoustic cargo surveillance method 200 generates residual values from the estimated values and actual values for the component frequencies from the second acoustic output. The residual values represent the acoustic change. Acoustic cargo surveillance method 200 then detects the residual values to be an anomalous acoustic change that indicates a change in cargo mass.

In one embodiment, the acoustic output of the vehicle includes engine noise and other sound caused by powered operation of the vehicle. Thus, in one embodiment of acoustic cargo surveillance method 200, the first acoustic output and second acoustic output comprise engine noise that is produced by operation of an engine of the vehicle.

In one embodiment, as discussed herein, acoustic surveillance of the vehicle is passive, and collects sound emitted by the vehicle with acoustic transducers such as microphones located apart from the vehicle without actively directing energy at the vehicle. For example, acoustic transducers deployed on vehicles other than the vehicle being surveilled (such as vehicles operated by an enforcement agency), deployed in fixed locations on land (such as along stretches of coastline or border) and/or water are located remotely from the vehicle under surveillance. Thus, in one embodiment, acoustic cargo surveillance method 200 further comprises passively recording the first acoustic output and the second acoustic output with one or more acoustic transducers that are located remotely from the vehicle. Additional detail on acoustic transducers and remote location is discussed below, for example under the headings "Example Acoustic Transducers" and "Example Implementations of Acoustic Cargo Surveillance".

In one embodiment of acoustic cargo surveillance method 200, the motor noise of the vehicle is recorded passively by acoustic transducers located away from the vehicle. Thus, in one embodiment of acoustic cargo surveillance method 200, the first acoustic output and second acoustic output comprise engine noise that is produced by operation of an engine of the vehicle, and the first acoustic output and the second acoustic output are passively recorded with one or more acoustic transducers that are located remotely from the vehicle.

In one embodiment, the alerts may be displayed using a graphical user interface. Thus, in one embodiment, acoustic cargo surveillance method 200 further comprises displaying a graphical user interface that includes a visual indication of a status of the alert. And, in one embodiment, acoustic cargo surveillance method 200 further comprises displaying a graphical user interface that includes a visual representation of the test Kiviat surface in a Kiviat tube of Kiviat surfaces for the vehicle at times other than that of the test Kiviat surface. Additional detail regarding the graphical user interface is discussed below, for example with reference to FIG. 7 under the heading "Example GUI for Acoustic Cargo Surveillance".

In one embodiment, acoustic fingerprints may be generated for the vehicle at the first time of surveillance and at the subsequent time in the surveillance in order to confirm that the same vehicle is being surveilled. This allows surveillance to be intermittent, with gaps in time where acoustic surveillance of the vehicle is discontinuous, for example when the vehicle is "lost" from surveillance, or when the vehicle enters an area where acoustic surveillance is not available. Thus, in one embodiment, acoustic cargo surveillance method 200 further includes generating a first acoustic fingerprint of the vehicle from the first acoustic output of the vehicle and generating a second acoustic fingerprint of the vehicle from the second acoustic output of the vehicle. Acoustic cargo surveillance method 200 then acoustically confirms that the first acoustic fingerprint matches the second acoustic fingerprint to verify that the first acoustic output and the second acoustic output were both recorded from the vehicle. Additional detail regarding acoustic fingerprinting is discussed below, for example with reference to FIG. 8 under the heading "Example Acoustic Fingerprinting for Confirming Vessel Identity".

In one embodiment, the acoustic change that is indicative of a change of mass of the cargo is a step change or abrupt change, rather than a gradual change. A step change in mass of the cargo occurs without a gradual taper between the initial mass and subsequent mass. A step change in mass of the cargo may be indicated by a steep or vertical slope between the initial mass and subsequent mass in a plot of cargo mass over time. Gradual changes may be indicative of consumption of fuel, whereas a step change is indicative of a removal or addition of an amount of mass in a short period of time. Thus, in one embodiment, acoustic cargo surveillance method 200 further comprises identifying that the vehicle has undergone a step-change shift in mass during operation.

In one embodiment, the vehicle is one of a variety of types of self-propelled devices for transporting cargo such as persons or things on or in water, through air, or over land. In one embodiment, the vehicle is a watercraft. In one embodiment, the vehicle is an aircraft. In one embodiment, the vehicle is a land craft.

Discussion and Additional Embodiments

In one embodiment, the systems and methods described herein for acoustic cargo surveillance provide for detection of step changes in cargo mass by change in acoustic output of a vehicle. In one embodiment, acoustic cargo surveillance leverages properties of Kiviat plotting of the component frequencies from the acoustic output of the vehicle to detect a change in the cargo mass being carried by the vehicle. A series of Kiviat surfaces or plots over time may be referred to as a Kiviat tube. Kiviat tubes may be used to represent multivariate time series signal data changing over time. The structure of a Kiviat tube consists of a series of Kiviat surfaces plotted in Kiviat charts. The Kiviat surfaces in the Kiviat tube represents the variables of the dataset at a single point in time. In one embodiment, a Kiviat tube may be employed for monitoring the mass of a vehicle (including the cargo mass). In one embodiment, a Kiviat surface may be used to represent amplitude values at multiple component frequencies in acoustic output of a vehicle at one point in time. In one embodiment, Kiviat tubes are used to represent multivariate time series signals of the multiple component frequencies as the amplitude values change over time.

In a Kiviat chart, each variable has a unique axis corresponding to the magnitude or amplitude of the variable. All of the individual axes intersect at a single point in the middle of the Kiviat chart. In one embodiment, to produce a Kiviat surface, the values for each variable are plotted at points along the respective axes for the variables, and the plotted points are then connected with adjacent points. The adjacent points for a point plotted on a given axis are a first adjacent point plotted for a first variable represented by an axis that is immediately clockwise from the given axis and a second adjacent point plotted for a second variable represented by an axis that is immediately counterclockwise from the given axis. The connection of the adjacent points on the axes describes a Kiviat surface, giving a more comprehensive overview of the response of a system than when comparing values individually.

Individual Kiviat surfaces can be a useful tool for understanding a multivariate system (such as component frequencies of acoustic output from a vehicle) at a single point in time. The Kiviat surface can also be leveraged to illustrate how a multivariate system changes over time by integrating Kiviat surfaces along a shared time axis into a three-dimensional (two-dimensional area of the Kiviat surface and a third dimension of time) Kiviat tube. Examples of Kiviat tubes may be seen in FIG. 6 below. In one embodiment, the acoustic cargo surveillance systems and methods described herein leverage the Kiviat tube to detect changes in acoustic output that indicate change in cargo mass. In one embodiment, changes in cargo mass can be detected by comparing volumes of Kiviat tubes representing acoustic output from vehicles operating under differing cargo loads. In one embodiment, changes in cargo mass can be detected by comparing the sequence of normalized areas of the Kiviat surface diagrams representing acoustic output from vehicles operating under differing cargo loads.

In one embodiment, detection of small step changes in cargo mass for a vessel involves transforming an acoustic waveform into multiple time-series signals. In one embodiment, the acoustic waveform represents acoustic output of a vehicle that has been recorded by one or more acoustic transducers such as a directional microphone. In one embodiment, the acoustic waveform is transformed into 3 to 30 separate time series signals. For example, the acoustic waveform may be transformed into approximately 20 separate time-series signals. Repeated experimentation has shown that transforming the acoustic waveform into 20 time series signals by binning the original acoustic waveform into 100 independent bins, selecting the top 20 bins in terms of amplitude in the frequency domain, and reporting out the frequency-dependent power metrics for the top 20 bins at a modest sampling interval (for example, 1-second intervals) results in highly accurate cargo-mass characterization performance at a modest compute cost.

Figure 8:
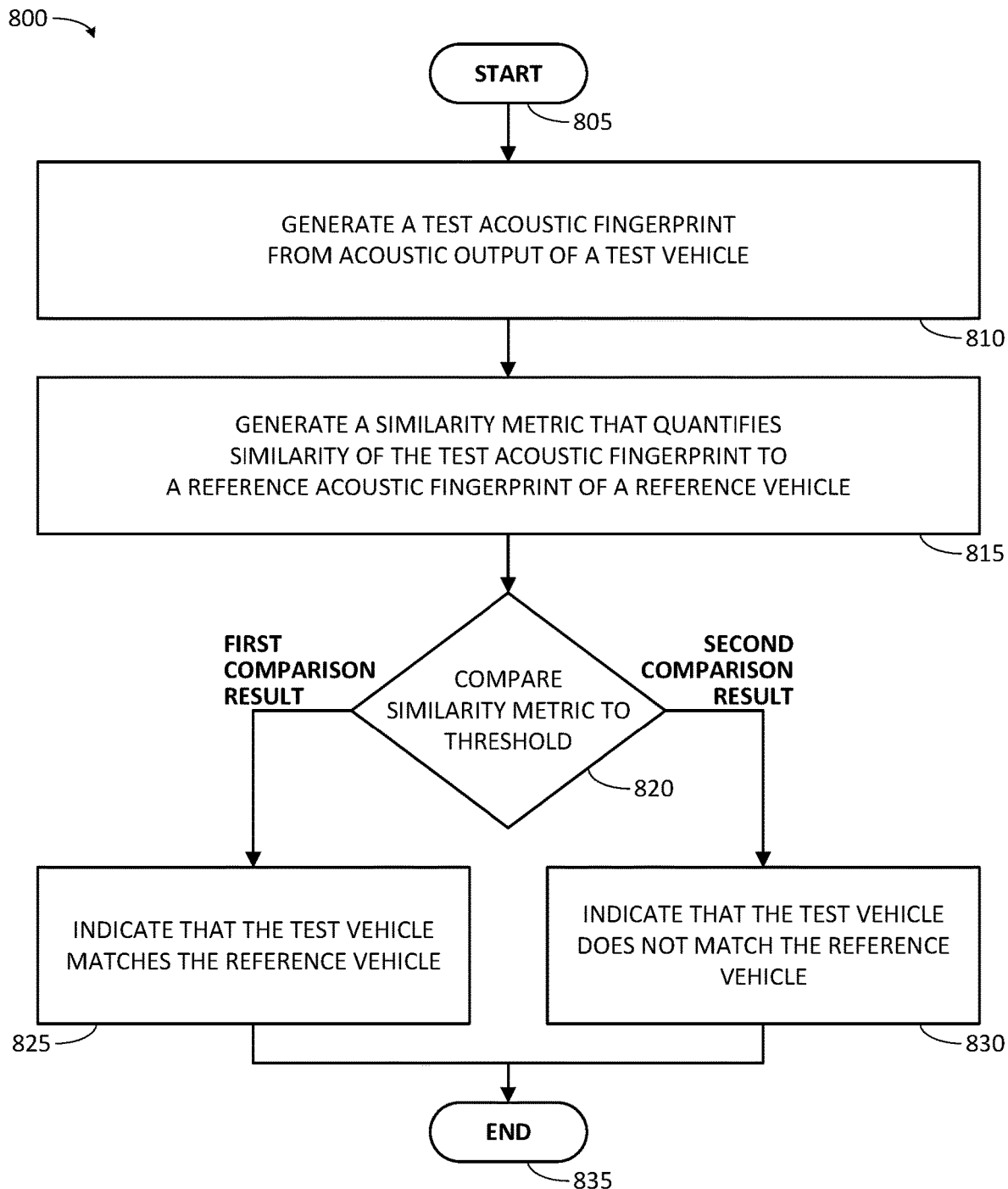
FIG. 8 illustrates one embodiment of an acoustic fingerprinting method associated with acoustic identification of a test vehicle that is being surveilled to acoustically detect changes in cargo mass.

In one embodiment, an acoustic fingerprinting technique (described in further detail elsewhere herein, for example with reference to acoustic fingerprinting method 800 and FIG. 8 under the heading "Example Acoustic Fingerprinting for Confirming Vessel Identity") may be used in conjunction with the acoustic cargo surveillance techniques described herein. Combined acoustic fingerprinting and acoustic cargo surveillance techniques enables additional identification of the type (for example, make and model) of vehicle or exact vehicle being used for to transport illicit cargo and provision of quantitative evidence that the exact vessel dropped off (or gained) approximate mass in one or more step changes in cargo while under passive surveillance.

To monitor the state of the vehicle, the measurements for each audio frequency at a point in time are plotted in a Kiviat-Diagram coordinate system to form 2D Kiviat surfaces. When repeated with regular time intervals (such as at one-second intervals in one embodiment), the series of Kiviat surfaces the trace out a 3D Kiviat tube. The Kiviat tube is as unique as a snowflake for a given vehicle. The Kiviat tube may significantly differ between various types (such as brands, makes, or models) of vehicles. The Kiviat tube may also change systematically with cargo load for a given vessel under surveillance. Systematic change in the Kiviat tube in response to change in cargo load enables acoustic cargo surveillance detection and characterization of small step-changes in cargo mass.

In one embodiment, a 3D Kiviat tube for a vehicle under surveillance is systematically compared to 3D Kiviat tube for a reference or golden sample taken for the vehicle. In one embodiment, the reference or golden sample represents the acoustic output of the vessel given the state of the vessel at the onset of surveillance. By subtracting corresponding points between the two Kiviat surfaces and calculating the annular area, step changes in cargo mass can be detected. Where the area of the Kiviat surface that represents the vessel under surveillance deviates from the area of the Kiviat surface that represents the reference for the vessel under surveillance, an alarm is actuated. In one embodiment, both of the two Kiviat surfaces are normalized in a manner that causes the reference surface to be a unit circle, also referred to as normalizing the reference Kiviat surface and test Kiviat surface to a unit circle of the reference Kiviat surface. In one embodiment, the measurements are repeated and checked at regular intervals so as to determine when shifts in cargo volume occur. In one embodiment, this process for acoustic cargo surveillance is further described in FIG. 3.

Example Acoustic Cargo Surveillance Method Using Kiviat Tubes

Figure 3:
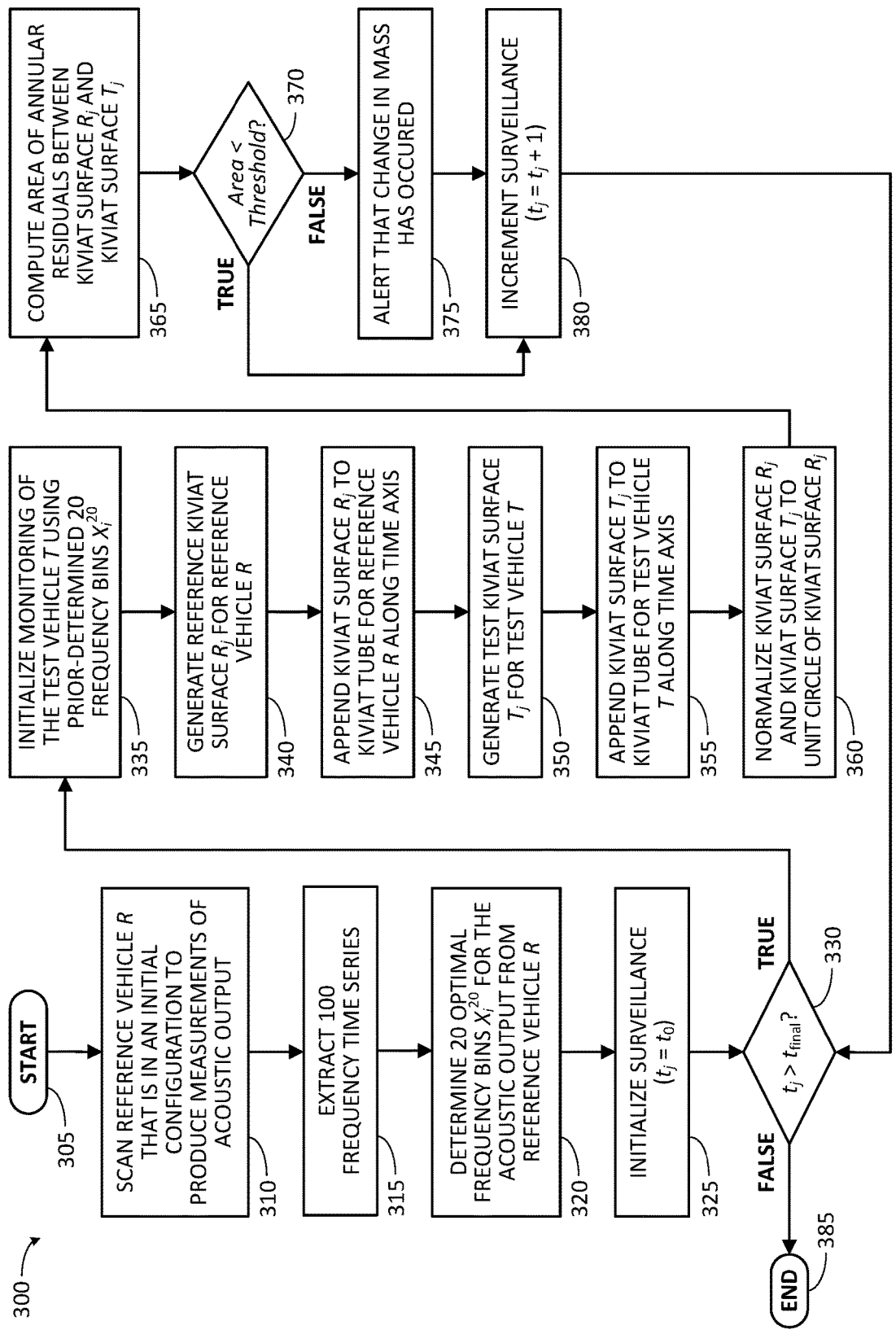
FIG. 3 illustrates one embodiment of an acoustic cargo surveillance method associated with acoustic detection of changes in cargo mass using Kiviat tubes.

FIG. 3 illustrates one embodiment of an acoustic cargo surveillance method 300 associated with acoustic detection of changes in cargo mass using Kiviat tubes. Acoustic cargo surveillance method 300 details a Kiviat-tube-based algorithm for passive detection of mass changes. In one embodiment, acoustic cargo surveillance method 300 initiates at START block 305 in response to conditions similar to those which initiate acoustic cargo surveillance method 300. Following initiation at start block 305, processing continues to process block 310.

In one embodiment, at process block 310, acoustic cargo surveillance method 300 scans a reference vehicle R that is in an initial configuration in order to produce measurements. The scan causes acoustic output of reference vehicle R to be received. The initial configuration is a first mass of cargo. The measurements record amplitudes of fine-grain frequencies of the acoustic output of reference vehicle R over a period of time. The fine-grain frequencies are subdivisions of an audio spectrum at a finest or native resolution of available from a spectrum analyzer.

In one embodiment, at process block 315, acoustic cargo surveillance method 300 extracts 100 frequency time series. The frequency time series are series of amplitude values sampled from coarse bins of the acoustic output at an interval of time. The coarse bins are discrete audio frequency ranges, which can include multiple fine-grain frequencies. In one embodiment, the audio spectrum is subdivided into 100 bins. A time series of amplitude values is sampled from each of the 100 coarse bins to produce the 100 frequency time series. For example, the amplitude values may be selected from representative frequencies of the bins, such as center frequencies for the bins.

In one embodiment, at process block 320, acoustic cargo surveillance method 300 determines 20 optimal frequency bins $X_i^{20}$ for the acoustic output from reference vehicle R (for example, the first acoustic output as discussed above at process block 220). The 20 optimal frequency bins are 20 frequency bins with the highest peaks of amplitude in a power spectral density (PSD) curve of the acoustic output for the period of time. The PSD curve may be generated, for example, by performing a fast Fourier transform on the acoustic output for the period of time to transform the acoustic output of the vehicle from a time domain into a frequency domain. The amplitude peaks may be ranked in order of peak height. The top 20 coarse bins containing the highest peaks are selected to be the 20 optimal frequency bins $X_i^{20}$ for the acoustic output of reference vehicle R. Representative frequencies of top 20 frequency bins are used as axes of Kiviat charts for describing the acoustic output.

Blocks 325-380 make up a loop for surveillance of the vehicle to detect a step change in cargo mass. In one embodiment, at process block 325, acoustic cargo surveillance method 300 initializes surveillance of the vehicle. In one embodiment, the surveillance is initiated in response to receiving acoustic output of a test (surveilled) vehicle T. A time $t_j$ is initialized to an initial time to at which the surveillance commenced, for example by reading a current time from a computer.

The variable j denotes an iteration count of the loop. Decision block 320 provides a condition for iterating the loop. In one embodiment, at decision block 330, acoustic cargo surveillance method 300 determines whether the time $t_j$ is greater than a final time $t_{final}$ at which surveillance of the vehicle terminates. In one embodiment, final time $t_{final}$ may be provided while the loop is being iterated by identifying as the final time $t_{final}$ a time at which a command to discontinue surveillance of the vehicle is received. In one embodiment, final time $t_{final}$ may be provided while the loop is being iterated by identifying as the final time $t_{final}$ a time at which acoustic output from test vehicle T is discontinued.

In one embodiment, at process block 335, acoustic cargo surveillance method 300 initializes monitoring of the test vehicle T using the prior-determined 20 frequency bins $X_i^{20}$. In one embodiment, monitoring of the test vehicle (or vehicle under surveillance) T is initiated by receiving a vector (or observation) of amplitude values from the acoustic output of the test vehicle T. The vector of amplitude values includes amplitude values at the current time $t_j$ for the 20 frequency bins $X_i^{20}$ in the acoustic output of the test vehicle T. The vector of amplitude values may be used to generate a Kiviat surface that represents the acoustic output of the test vehicle T at the time $t_j$ (at process block 350).

In one embodiment, at process block 340, acoustic cargo surveillance method 300 generates a reference Kiviat surface $R_j$ for reference vehicle R. In one embodiment, the reference Kiviat surface $R_j$ is generated from the measurements of acoustic output taken in the initial scan of reference vehicle R (at process block 310). In one embodiment, the reference Kiviat surface $R_j$ is generated by plotting points for values sampled from the 20 frequency bins $X_i^{20}$ at a time point during the initial scan on axes for the 20 frequency bins $X_i^{20}$ in a Kiviat chart and connecting the adjacent points, as discussed in further detail above.

In one embodiment, a time series database of time series signals sampled from the 20 frequency bins $X_i^{20}$ in the acoustic output taken in the initial scan of reference vehicle R may be used to create reference Kiviat surfaces such as reference Kiviat surface $R_j$. In one embodiment, the next available time point increments through the time series database of the initial scanned reference acoustic output in a repeating loop. In this configuration, the next available time point is a loop of times $t_m$ where $t_m<t_0$. This provides an endless sequence of reference values from which to create reference Kiviat surfaces.

In one embodiment, the time series database of initial scanned reference acoustic output (of length n observations) precedes values subsequently scanned during the surveillance, forming the time series database of length n+j observations. In this configuration, the next available time point is at time $t_{j-n}$ in the time series database. This provides reference values in a manner that accommodates slow change in mass due to fuel consumption, but remains sensitive to step changes due to cargo drop-off or pick-up.

Thus, in one embodiment, the reference vehicle is the test vehicle at an earlier time, at either time $t_{j-n}$ or time $t_m$ where $t_m<t_0$. In one embodiment, the values for the 20 frequency bins $X_i^{20}$ of the next available time point are drawn from the time series database to generate reference Kiviat surface $R_j$. Reference Kiviat surface $R_j$ may be used as a reference Kiviat surface which may be compared with a test Kiviat surface to produce a residual area that represents acoustic change from a time that the initial scan occurred (at either time $t_{j-n}$ or time $t_m$ where $t_m$ is before to) to the current time $t_j$. Additional detail regarding reference Kiviat surfaces is provided below with reference to FIGS. 4 and 5.

In one embodiment, at process block 345, acoustic cargo surveillance method 300 appends the reference Kiviat surface $R_j$ to a Kiviat tube for the reference vehicle R along a time axis. In one embodiment, the reference Kiviat surface $R_j$ is added to the Kiviat tube for the reference vehicle R in an index position for time $t_j$ to place Kiviat surface $R_j$ into the Kiviat tube in time order along the time axis. Additional detail regarding the Kiviat tube for the reference vehicle R is described below with reference to FIG. 6.

In one embodiment, at process block 350, acoustic cargo surveillance method 300 generates a test Kiviat surface $T_j$ for test vehicle T. In one embodiment, the test Kiviat surface $T_j$ is generated by plotting points for values sampled from the 20 frequency bins $X_i^{20}$ at time $t_j$ on axes for the 20 frequency bins $X_i^{20}$ in a Kiviat chart and connecting the adjacent points, as discussed in further detail above. Additional detail regarding test Kiviat surfaces is provided below with reference to FIGS. 4 and 5.

In one embodiment, at process block 355, acoustic cargo surveillance method 300 appends the test Kiviat surface $T_j$ to a Kiviat tube for the test vehicle T along a time axis. In one embodiment, the test Kiviat surface $T_j$ is added to the Kiviat tube for the test vehicle T in an index position for time $t_j$ to place Kiviat surface $T_j$ into the Kiviat tube in time order along the time axis. Additional detail regarding the Kiviat tube for the test vehicle T is described below with reference to FIG. 6.

In one embodiment, at process block 360, acoustic cargo surveillance method 300 normalizes reference Kiviat surface $R_j$ and test Kiviat surface $T_j$ to a unit circle of reference Kiviat surface $R_j$. In one embodiment, coefficients are identified for the axes of the Kiviat chart. The coefficients identified are those that when the reference value plotted on an axis for the reference Kiviat surface $R_j$ is multiplied by the coefficient for the axis, the product of the reference value and coefficient for each axis is a same value that is shared in common for all axes. The value is a unit, for example, 1 Bel (10 decibels). Thus normalized, the reference Kiviat surface $R_j$ forms a unit polygon (in particular, a unit icosagon having 20 corner points on the axes of the Kiviat chart) which approximates a unit circle. In one embodiment, the test value plotted on each axis for the test Kiviat surface $T_j$ is also multiplied by the coefficient for the axis, thus normalizing the test Kiviat surface $T_j$ to the unit circle of the reference Kiviat surface $R_j$.

In one embodiment, at process block 365, acoustic cargo surveillance method 300 computes an area of annular residuals between reference Kiviat surface $R_j$ and test Kiviat surface $T_j$. The area of the annular residual is the area bounded by a border or outline of the normalized, unit circle reference Kiviat surface $R_j$ and a border or outline of the normalized test Kiviat surface $T_j$. Where the borders intersect, the areas inside and outside the unit circle add cumulatively. The computed area of annular residuals (or residual area) represents acoustic change from a time that the initial scan occurred (at either time $t_{j-n}$ or time $t_m$ where $t_m$ is before $t_0$) to the current time $t_j$.

In one embodiment, at decision block 370, acoustic cargo surveillance method 300, the area of annular residuals is compared to a threshold area to determine if the area of annular residuals remains below the threshold area. The threshold area represents an acoustic change that is large enough to indicate a change in cargo mass. Where the area of annular residuals equals or exceeds the threshold area, a change in cargo mass is indicated, and processing continues to process block 375. Where the area of annular residuals remains below the threshold area, no step change in cargo mass is indicated, and processing continues to process block 380. In one embodiment, the threshold is a portion of area of the normalized, unit circle reference Kiviat surface $R_j$. For example, the threshold is in a range of 0.01% to 50% of the area of the normalized, unit circle reference Kiviat surface $R_j$, and may be chosen to effect a desired level of sensitivity to cargo drop-offs and pick-ups. In one example, the threshold is 5% of the area of the normalized, unit circle reference Kiviat surface $R_j$.

In one embodiment, at process block 375, acoustic cargo surveillance method 300 generates an alert that a change in mass has occurred. In one embodiment, the alert is generated in response to determining that a change in cargo mass has occurred, based on annular residuals meeting or exceeding the threshold. Alert generation at process block 375 is bypassed where no change in cargo mass has occurred. In one embodiment, the alert is generated as discussed above with reference to process block 220 of method 200.

In one embodiment, at process block 380, acoustic cargo surveillance method 300 increments the surveillance to the next observation of the test vehicle T. The time $t_j$ is incremented by 1 (e.g., 1 second), $t_j=t_j+1$.

From process block 380, processing returns to decision block 330. In one embodiment, at decision block 330, the acoustic cargo surveillance method 300 determines whether to continue through another iteration of the loop of surveillance, or to proceed to END block 385 where acoustic cargo surveillance method 300 ends. Acoustic cargo surveillance method 300 proceeds to END block 385 once the time counter $t_j$ is greater than the final time $t_{final}$.

Example Kiviat Surfaces for Acoustic Cargo Surveillance

Figure 4:
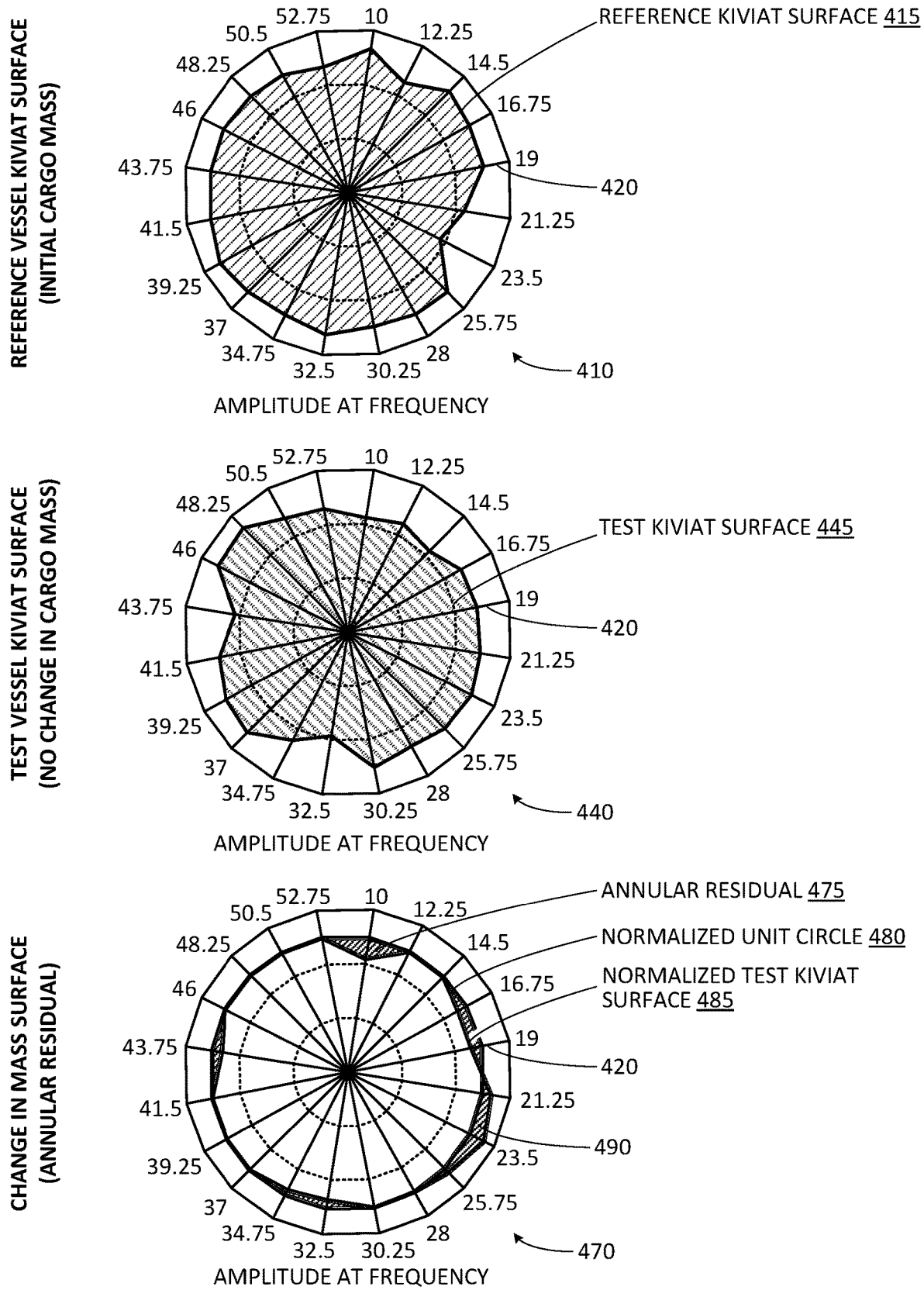
FIG. 4 illustrates three Kiviat charts associated with finding no cargo mass change in an example watercraft using acoustic cargo surveillance.

FIG. 4 illustrates three Kiviat charts associated with finding no cargo mass change in an example watercraft (or "vessel") using acoustic cargo surveillance. A first Kiviat chart 410 shows a reference Kiviat surface 415 for a reference vessel plotted on first Kiviat chart 410. The reference Kiviat surface 415 represents the acoustic output of the reference vessel at a time when the reference vessel is configured with an initial cargo mass. First Kiviat chart 410 includes 20 axes (N=20), one for each of 20 frequency bins (such as frequency bins $X_i^{20}$). The axes represents the center (or other representative) frequencies of the frequency bins. For example, example axis 420 represents a 19 kHz frequency bin. Other axes represent frequency bins centered on 10 kHz, 12.25 kHz, 14.5 kHz, 16.75 kHz, 21.25 kHz, 23.5 kHz, 25.75 kHz, 28 kHz, 30.25 kHz, 32.5 kHz, 34.75 kHz, 37 kHz, 39.25 kHz, 41.5 kHz, 43.75 kHz, 46 kHz, 48.25 kHz, 50.5 kHz, and 52.75 kHz. In one embodiment, the axes are arranged clockwise in ascending order of the frequency bin that the axis represents, for example as shown in FIG. 4. Other orders for the axes may also be used, for example arranging the axes in order of height of the power spectral density curve peak for the frequency bin that the axis represents. In first Kiviat chart 410, reference Kiviat surface 415 has not been normalized to a unit circle.

A second Kiviat chart 440 shows a test Kiviat surface 445 for a test vessel plotted on second Kiviat chart 440. Second Kiviat chart 440 includes the 20 axes (such as example axis 420) also shown in first Kiviat chart 410. The test Kiviat surface 445 represents the acoustic output of the test vessel at a time when it is under surveillance. At the time of surveillance represented by test Kiviat surface 445, there has been no change in cargo mass from the initial cargo mass of the vessel. Recall that, in one embodiment, the terms "reference" and "test" when applied to a vehicle refer to the same vehicle at different stages of analysis-reference vehicle/vessel at an initial scan to establish acoustic output for carrying an initial cargo mass, and test vehicle/vessel during subsequent surveillance to detect changes in cargo mass.

A third Kiviat chart 470 shows an annular residual 475 between reference Kiviat surface 415 and test Kiviat surface 445. On third Kiviat chart 470, the reference Kiviat surface 415 is normalized so that the reference Kiviat surface 415 is shown as a unit circle, normalized unit circle 480. The test Kiviat surface 445 is shown normalized by the ratios on each axis that were also used to normalize reference surface 415 to the normalized unit circle 480 to produce normalized test Kiviat surface 485. The annular residual 475 has an area which is the sum of the area between the outlines of the normalized unit circle 480 and the normalized test Kiviat surface 485. Portions of the annular residual 475 that are outside (radially further from the center) of the normalized unit circle 480 (such as example portion 490) are added to the area of the annular residual 475 cumulatively with the portions of the annular residual 475 that are within the normalized unit circle 480. Thus, the area of annular residual 475 is the absolute value of the difference between normalized unit circle 480 and normalized test Kiviat surface 485.

Thus, areas on either side of the normalized unit circle 480 do not deduct from each other when generating the area of the annular residual 475.

In FIG. 4, the area of annular residual 475 is sufficiently small to fall below a threshold for detecting a cargo mass change in the example vessel. For example, the area of annular residual 475 may be less than 5% of the area of normalized unit circle 480. Thus, because the threshold ratio for detecting a cargo mass step change is not satisfied, no cargo mass change is detected for the example vessel for FIG. 4.

Figure 5:
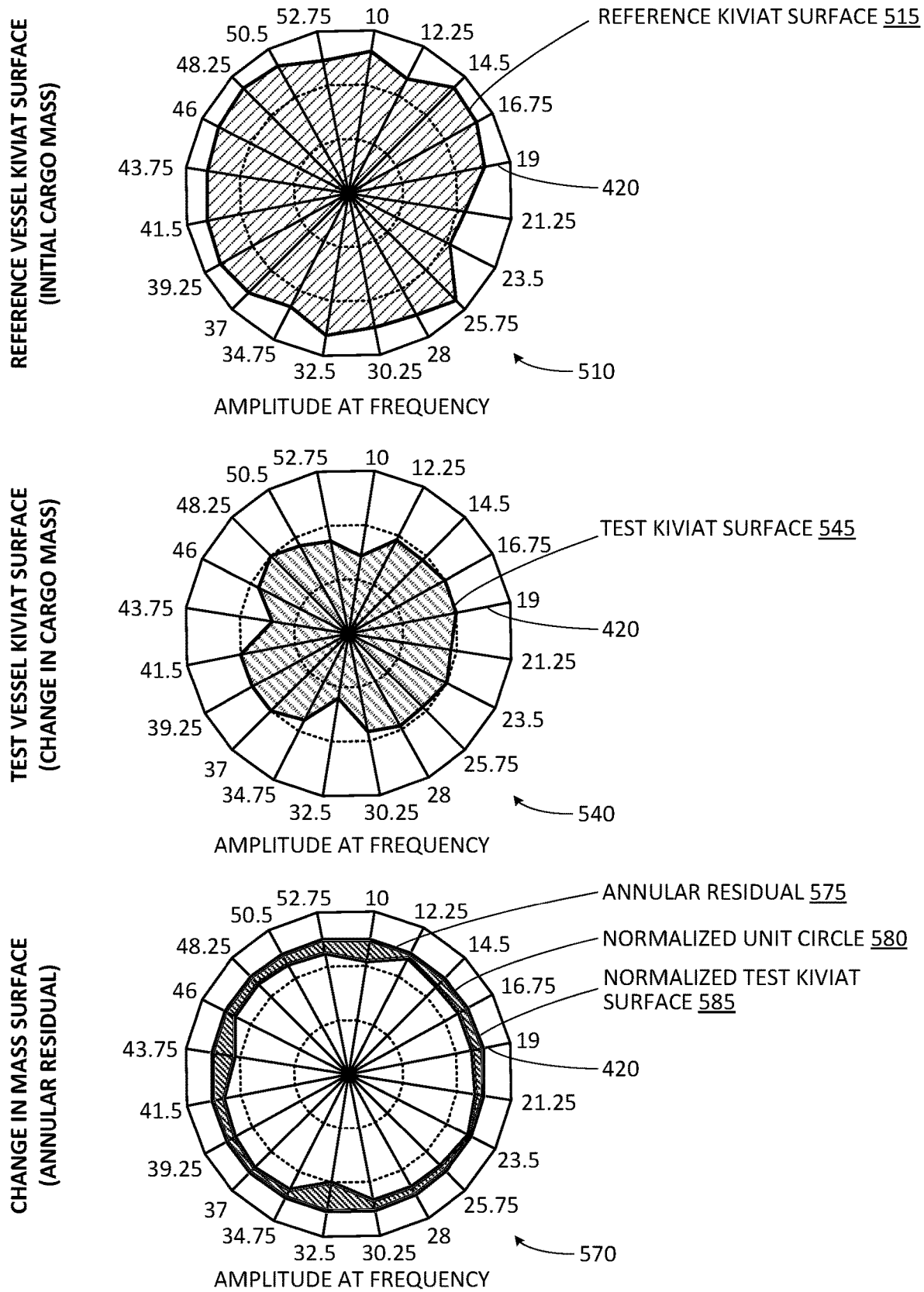
FIG. 5 illustrates three Kiviat charts associated with finding a cargo mass change in an example watercraft using acoustic cargo surveillance.

FIG. 5 illustrates three Kiviat charts associated with finding a cargo mass change in the example watercraft using acoustic cargo surveillance. A fourth Kiviat chart 510 shows a reference Kiviat surface 515 for a reference vessel plotted on fourth Kiviat chart 510. As in FIG. 4 above, the reference Kiviat surface 515 represents the acoustic output of the reference vessel at a time when it is configured with an initial cargo mass. Again, fourth Kiviat chart 510 includes 20 axes, one for each representative frequency of 20 frequency bins (such as frequency bins $X_i^{20}$). These axes have the frequency values used in the first Kiviat chart 410, second Kiviat chart 440, and third Kiviat chart 470 shown in FIG. 4 to enable comparison between the examples of FIG. 4 and FIG. 5. For example, as before, example axis 420 represents a 19 kHz frequency bin. In fourth Kiviat chart 510, reference Kiviat surface 515 has not been normalized to a unit circle.

A fifth Kiviat chart 540 shows a test Kiviat surface 445 for a test vessel plotted on fifth Kiviat chart 540. Fifth Kiviat chart 540 includes the 20 axes also shown in fourth Kiviat chart 510. The test Kiviat surface 545 represents the acoustic output of the test vessel at a time when it is under surveillance. At the time of surveillance represented by test Kiviat surface 545, there has been a change in cargo mass from the initial cargo mass of the vessel. As above, reference vessel and test vessel refer to the example watercraft at different stages of analysis-reference vessel during an initial scan to establish acoustic output for carrying the initial cargo mass, and test vessel during subsequent surveillance to detect changes in cargo mass.

A sixth Kiviat chart 570 shows an annular residual 575 between reference Kiviat surface 515 and test Kiviat surface 545. On sixth Kiviat chart 570, the reference Kiviat surface 515 is normalized so that the reference Kiviat surface 515 is shown as a unit circle, normalized unit circle 580. The test Kiviat surface 545 is shown normalized by the ratios on each axis that were also used to normalize reference surface 515 to the normalized unit circle 580 to produce normalized test Kiviat surface 585. The annular residual 575 has an area which is the sum of the area between the outlines of the normalized unit circle 580 and the normalized test Kiviat surface 585. In FIG. 5, the area of annular residual 575 is sufficiently large to be above a threshold for detecting a cargo mass change in the example vessel. For example, the area of annular residual 575 may be greater than 5% of the area of normalized unit circle 580. Thus, because the threshold ratio for detecting a cargo mass step change is satisfied, a cargo mass change is detected for the example vessel for FIG. 5.

Example Kiviat Tubes for Acoustic Cargo Surveillance

Figure 6:
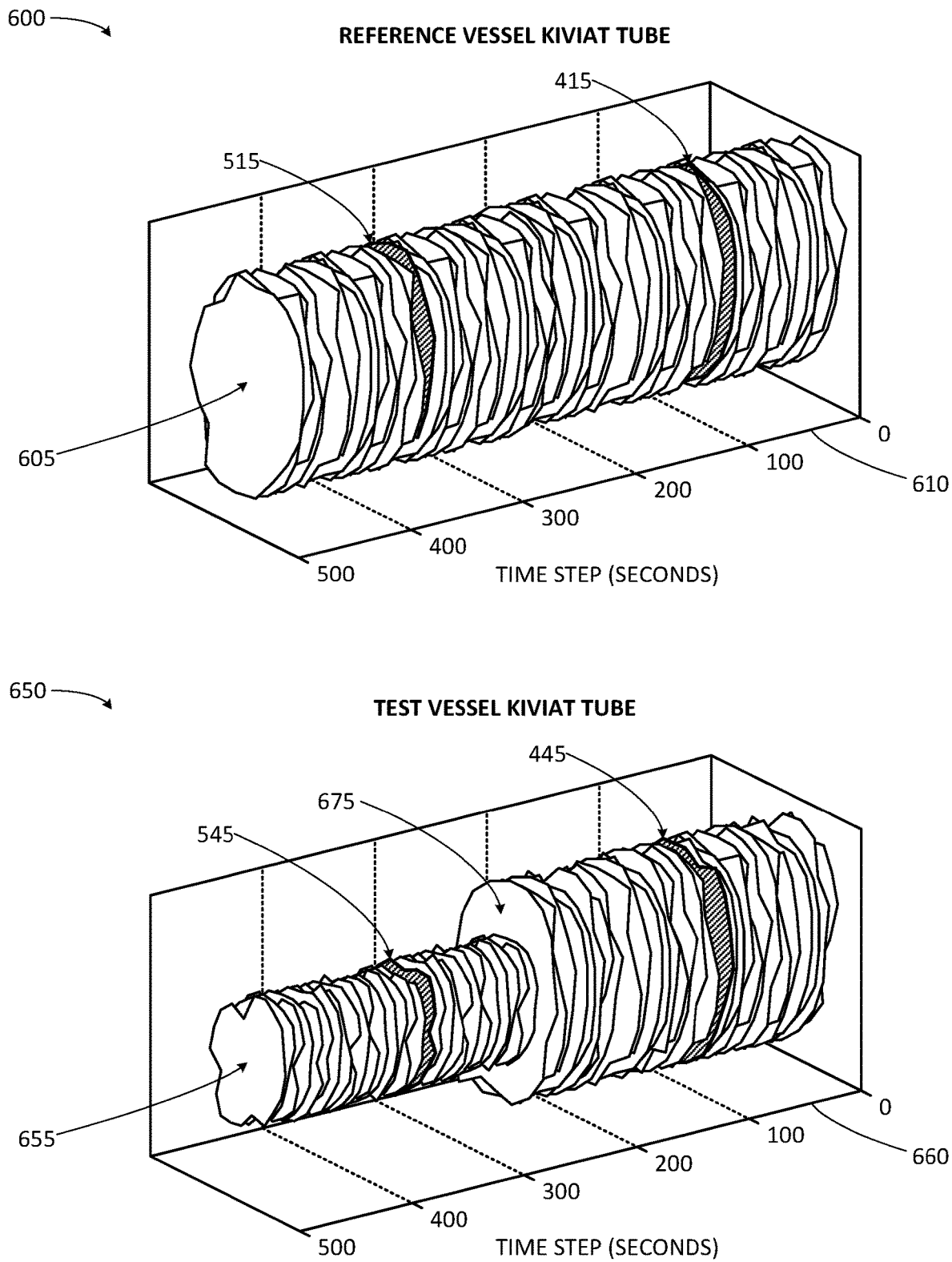
FIG. 6 illustrates two example plots of Kiviat tubes for an example watercraft.

In one embodiment, Kiviat surfaces may be compiled sequentially in time into a series referred to herein as a Kiviat tube. FIG. 6 illustrates two example plots of Kiviat tubes, first plot 600 and second plot 650 for the example watercraft discussed above with reference to FIGS. 4 and 5. The example Kiviat tubes represent the acoustic output of the example watercraft at intervals such as one-second intervals. The acoustic output at each interval is represented by a Kiviat plot describing the amplitude in the selected top frequency bins (such as top 20 frequency bins $X_i^{20}$). As shown, the example Kiviat tubes are 500 seconds long, including 500 individual Kiviat plots.

First plot 600 of an example reference Kiviat tube 605 for a reference vessel is shown as a series of Kiviat surfaces plotted along a time axis 610. In one embodiment, example reference Kiviat tube 605 represents the acoustic output of the example watercraft during an initial range of time when the example watercraft is configured with an initial cargo mass. Reference Kiviat surface 415 and reference Kiviat surface 515 are included in example reference Kiviat tube 605.

Second plot 650 of an example test Kiviat tube 655 for a test vessel is shown as a series of Kiviat surfaces plotted along a time axis 660. In one embodiment, example test Kiviat tube 655 represents the acoustic output of the example watercraft during a range of time when the example watercraft is under acoustic surveillance for a step change away from carrying the initial cargo mass. Example test Kiviat tube 655 represents the acoustic output at intervals such as one-second intervals. Test Kiviat surface 445 and test Kiviat surface 545 are included in example test Kiviat tube 655.

A step change 675 in the cargo mass of the test vessel occurs during acoustic surveillance at 251 seconds, as seen in example test Kiviat tube 655. The test vessel operates with the expected mass from 0-250 seconds. That there is no change from the initial cargo mass may be confirmed by the difference between a reference Kiviat surface in example reference Kiviat tube 605 and a test Kiviat surface in example test Kiviat tube 655 at a corresponding timepoint remaining below a threshold amount. For example, as discussed above with reference to FIG. 4, the area of annular residual 475 between reference Kiviat surface 415 and test Kiviat surface 445 is less than the threshold of 5% of the area of normalized unit circle 480. That there is no change from the initial cargo mass may also be confirmed by the commensurate volumes of the example reference Kiviat tube 605 and example reference Kiviat tube 655 between 0 and 250 seconds. Thus, until the step change 675 at 251 seconds, the example test vessel is carrying cargo of a weight consistent with expected values of the initial cargo load.

At 251 seconds, the step change 675 that indicates a change to the cargo mass of the test vessel occurs. In general, both reduction in mass (drop-off) and increase in mass (pick-up) can cause a step change in a Kiviat tube. In this example, reduced cargo mass is detected by the step change. From 251-500 seconds, the test vessel operates with less than the expected mass. That there has been a change from the initial cargo mass may be confirmed by the difference between a reference Kiviat surface in example reference Kiviat tube 605 and a test Kiviat surface in example test Kiviat tube 655 at a corresponding timepoint exceeding a threshold amount. For example, as discussed above with reference to FIG. 5, the area of annular residual 575 between reference Kiviat surface 515 and test Kiviat surface 545 is greater than the threshold of 5% of the area of normalized unit circle 580. That there has been a change from the initial cargo mass may also be confirmed by the differing volumes of the example reference Kiviat tube 605 and example reference Kiviat tube 655 after the step change 675 at 251 seconds. Thus, the Kiviat plots in example reference Kiviat tube 655 from 251-500 seconds, describe acoustic output of the test vessel after cargo has been removed, as indicated by the change in size of the Kiviat tubes and the relative change between the reference and test surfaces for corresponding times.

The differences between the reference and test surfaces will trigger an alarm. The alarm may initiate further investigation of the vessel when the vessel docks. The alarm may initiate recording a location of the vessel when the mass change occurred.

Example GUI for Acoustic Cargo Surveillance

The results of the acoustic cargo surveillance described herein may be presented in a graphical user interface (GUI). In one embodiment, the GUI simultaneously displays the selected top frequency bins (such as top 20 frequency bins $X_i^{20}$) over the time period of surveillance. In one embodiment, the GUI displays a current state for the vessel, denoted by a plot of a test (or surveilled) Kiviat surface, a state of the vessel under nominal operation, denoted by a plot of a reference Kiviat surface, and a current relative difference between the two surfaces, denoted by a change in mass detection Kiviat plot of the annular residuals between the normalized reference and test Kiviat surfaces.

Figure 7:
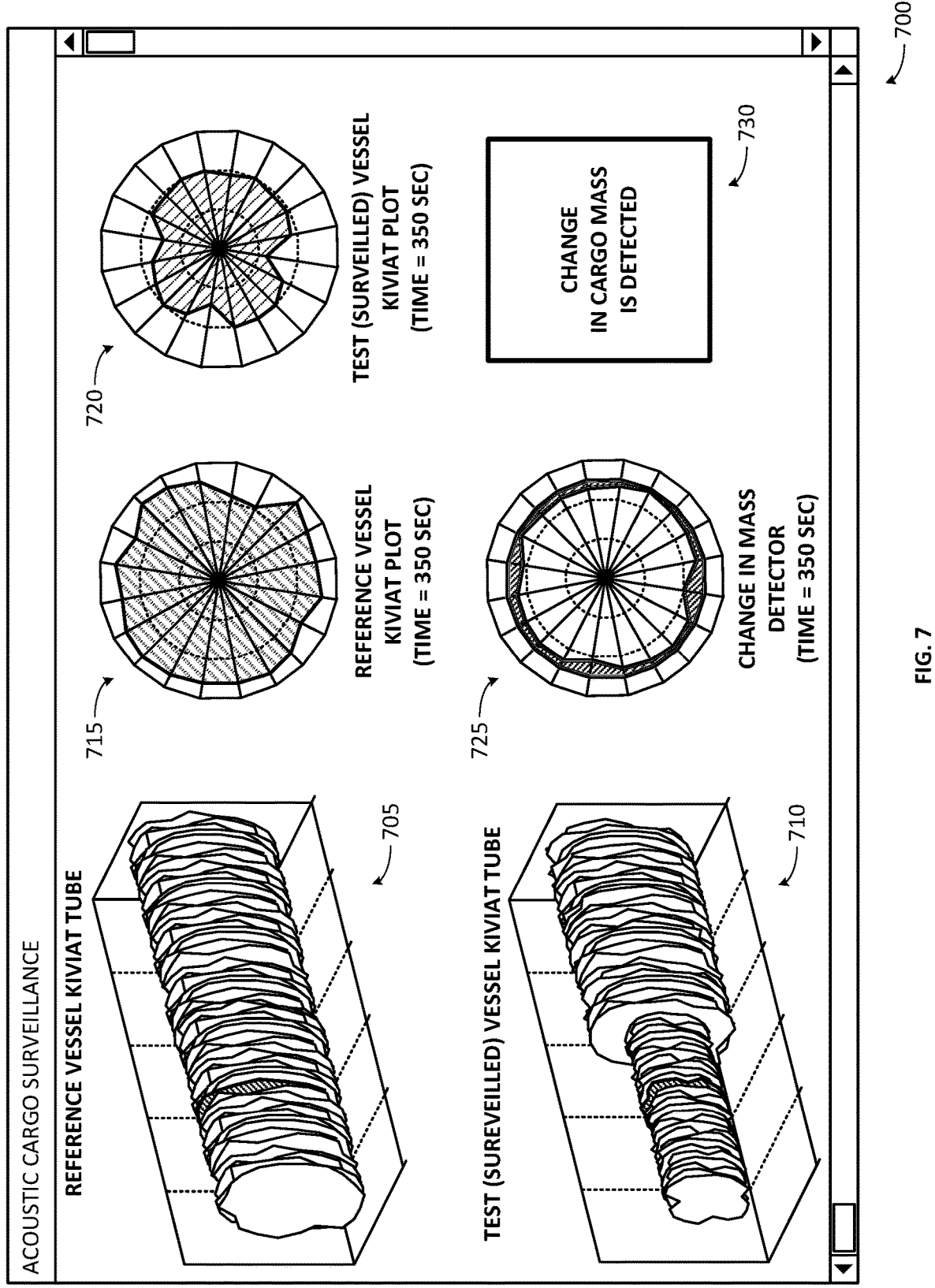
FIG. 7 illustrates an example graphical user interface for alerting a user to a change in cargo mass of a vehicle associated with acoustic detection of changes in cargo mass.

FIG. 7 illustrates an example GUI 700 for alerting a user to a change in cargo mass of a vehicle associated with acoustic detection of changes in cargo mass. Example GUI 700 displays information about whether or not a cargo mass change has been detected for an example watercraft (vessel) or other vehicle. Example GUI 700 may display a plot of a reference vessel Kiviat tube 705 (for example, similar to first plot 600 discussed above) and a plot of a test (or surveilled) vessel Kiviat tube 710 (for example, similar to second plot 650 discussed above). Plot of reference vessel Kiviat tube 705 shows a Kiviat tube of acoustic output of the vehicle carrying an initial mass of cargo. Plot of test vessel Kiviat tube 710 shows a Kiviat tube of acoustic output of the vehicle while the vehicle is under surveillance. Display of reference and test Kiviat tubes provides an intuitive way to visualize a change in acoustic output that is due to a change in cargo mass.

Example GUI 700 may display a reference vessel Kiviat plot 715, a test (surveilled) vessel Kiviat plot 720, and a change in mass detector 725 Kiviat plot. Reference vessel Kiviat plot 715 represents the acoustic output of the example watercraft when configured with an initial mass of cargo, similar to first Kiviat chart 410 and fourth Kiviat chart 510 described above. Test (surveilled) vessel Kiviat plot 720 represents the acoustic output of the example watercraft when under surveillance, similar to second Kiviat chart 440 and fifth Kiviat chart 540 described above. Change in mass detector 725 represents the annular residuals between a reference Kiviat surface shown in reference vessel Kiviat plot 715 and a test Kiviat surface shown in test (surveilled) vessel Kiviat plot 720, each normalized to a unit circle of the reference surface, similar to third Kiviat chart 470 and sixth Kiviat chart 570 described above. Although not shown in FIG. 7, the various plots 705-725 in Example GUI 700 may be labeled with axes and units, for example as shown in FIGS. 4-6.

GUI 700 shows an example point in time (time=350 seconds) when the vessel is operating after some weight (cargo mass) has been removed from the vessel, as indicated by a visible change in size of the Kiviat tubes and the relative change between the two surfaces by more than a threshold amount, as discussed above. The differences between the surfaces will trigger an alert. The alert may cause an alert indicator 730 to be displayed in response to detection of the cargo mass change. Alert indicator 730 may remain undisplayed until a change in cargo mass is detected. Alert indicator may state that a change in cargo mass has been detected. In one embodiment, alert indicator 730 may be configured as a shape with a color that attracts attention of a user, such as red. Alert indicator 730 may prompt the user to initiate further investigation of the vessel, for example when the vessel returns to dock, or by interdicting the vessel.

In one embodiment, the GUI may be animated. An animation in the GUI may show the change over time of the reference vessel Kiviat plot 715, test (surveilled) vessel Kiviat plot 720, and change in mass detector 725 Kiviat plot. The animation may also highlight the positions over time of the reference vessel Kiviat plot 715, test (surveilled) vessel Kiviat plot 720 in the reference vessel Kiviat tube 705 and plot of a test (or surveilled) vessel Kiviat tube 710, respectively. In one embodiment, the animation may be shown in real-time with ongoing surveillance. In one embodiment, alert indicator 730 will appear concurrently with display of change in mass detector 725 Kiviat plots that indicate that a cargo mass change has occurred. And, alert indicator 730 will disappear and/or not be shown concurrently with display of change in mass detector 725 Kiviat plots that indicate that no cargo mass change has occurred. In one embodiment, alert indicator will be substituted with a no-alert indicator (not shown) where no change in cargo mass has been detected. For example, no-alert indicator may state that there has been no change in cargo mass.

In one embodiment, the time at which the cargo mass change occurred—for example, when the cargo mass change was first detected—may be displayed on the GUI and stored for future reference. In one embodiment, a location of the vessel at the time at which the cargo mass change occurred may be displayed on the GUI and stored for future reference. This location of the vessel may be derived from triangulation from multiple surveillance locations.

Example Acoustic Fingerprinting for Confirming Vessel Identity

In one embodiment, the acoustic cargo surveillance system uses acoustic fingerprints of the reference and test (surveilled) vehicle to confirm whether the reference and test (surveilled) vehicle are the same vehicle. This may be useful where acoustic surveillance is discontinuous between the first time of surveillance of the vehicle (when the first acoustic output of the vehicle carrying the initial mass of cargo is recorded) and the second time of surveillance of the vehicle carrying the cargo. For example, a vehicle may leave an area where it can be detected by acoustic transducers (for example, a boat entering a hidden bay or inlet), add or remove cargo, and then return to the area where the vehicle can be detected by the acoustic transducers. The acoustic fingerprint can confirm that the vehicle with a changed cargo mass is still the same vehicle that had the initial cargo mass. In one embodiment, the acoustic cargo surveillance system uses acoustic fingerprints of the test (surveilled) vehicle to access and retrieve information about the test vehicle from a library of acoustic fingerprints (as discussed below under the heading "Acoustic Fingerprint Library".

In one embodiment, acoustic fingerprinting of a vehicle automatically identifies the vehicle based on sounds made by the vehicle. In one embodiment, acoustic cargo surveillance system includes an acoustic fingerprinting system. The acoustic fingerprinting system automatically extracts the most informative frequencies from the sounds made by the vehicle to form an acoustic fingerprint, and determines how similar the acoustic fingerprint is to a reference. In one embodiment, based on the similarity, the acoustic fingerprinting system can identify the vehicle as a specific individual. Like the acoustic cargo surveillance methods discussed above, acoustic fingerprint surveillance is passive, collecting sound wave vibrations emitted by operation of the target vehicle without the need to direct energy at the target.

In one embodiment, as an overview of acoustic fingerprinting, an acoustic fingerprint for a test vehicle is generated from measurements of acoustic (sound) output of the test vehicle. A similarity metric is then generated. The similarity metric quantifies similarity of the acoustic fingerprint for the test vehicle (also referred to herein as the test acoustic fingerprint) to another acoustic fingerprint for a reference vehicle (also referred to herein as the reference acoustic fingerprint). The similarity metric is then compared to a threshold. In one embodiment, the threshold indicates a particular level of similarity between the test and reference acoustic fingerprints that distinguishes match and non-match between the test and reference acoustic fingerprints, and, by extension, between the test and reference vehicles. In response to a first result of the comparison of the similarity metric to the threshold, the acoustic fingerprinting system indicates that the test vehicle matches the reference vehicle. In response to a second result of the comparison of the similarity metric to the threshold, the acoustic fingerprinting system indicates that the test vehicle does not match the reference vehicle.

FIG. 8 illustrates one embodiment of an acoustic fingerprinting method 800 associated with acoustic identification of a test vehicle that is being surveilled to acoustically detect changes in cargo mass. At a high level, in one embodiment, acoustic fingerprinting method 800 is a method for determining whether a test vehicle matches a reference vehicle based on similarity between acoustic fingerprints of the test and reference vehicles.

As an overview, in one embodiment, the acoustic fingerprinting method 800 generates an acoustic fingerprint for the test vehicle (also referred to as a test acoustic fingerprint). The test acoustic fingerprint provides a signature of sounds made by the test vehicle during operation. The acoustic fingerprinting method 800 then generates a similarity metric that quantifies similarity between the test acoustic fingerprint and a reference acoustic fingerprint. The reference acoustic fingerprint provides a signature of sounds made by a reference vehicle during operation. The similarity metric provides a value that indicates an extent to which the test and reference acoustic fingerprints resemble each other or differ from each other. The acoustic fingerprinting method 800 then compares the similarity metric to a threshold. The threshold may be a pre-determined threshold indicating an amount of similarity that distinguishes between a match or non-match of the fingerprints. By extension, match between the test and reference acoustic fingerprints indicates match between the test and reference vehicles. Accordingly, in response to the comparison result between the test and reference acoustic fingerprints, the acoustic fingerprinting method 800 indicates that the test vehicle either matches, or does not match, the reference vehicle.

In one embodiment, the acoustic fingerprinting method 800 initiates at start block 805 in response to an acoustic cargo surveillance system (such as system 100) determining one or more of: (i) a computer configured as or as part of an acoustic cargo surveillance system (such as system 100) has received or has begun receiving acoustic output of a test vehicle; (ii) acoustic surveillance of a test vehicle has commenced or has completed; (iii) a user (or administrator) of an acoustic cargo surveillance system (such as system 100) has initiated method 800; or (iv) that method 800 should commence in response to occurrence of some other condition. Method 800 continues to process block 810.

At process block 810, the processor generates a test acoustic fingerprint from acoustic output of a test vehicle. In one embodiment, an acoustic fingerprint is a signature that characterizes sound produced during the operation of a device. In one embodiment, this fingerprint or signature includes acoustic information that is specific to the operation of a specific device, such as acoustic components of engine noise. Such an acoustic fingerprint may be used to uniquely identify a device. Therefore, in one embodiment, the test acoustic fingerprint is generated from the acoustic output of the test vehicle to be an acoustic operation signature that is specific to the test vehicle.

In one embodiment, to generate the acoustic fingerprint, the processor performs a bivariate frequency-domain to time-domain transformation of the fine frequency amplitude information in the acoustic output of the test vehicle. The processor then forms the acoustic fingerprint from time series signals of amplitude values in selected frequency ranges.

In one embodiment, to effect the frequency-domain to time-domain transformation, the processor divides or groups the fine frequencies of the acoustic output into coarse frequency bins. In one embodiment, the range of fine frequency signals in a coarse frequency bin are represented by a representative signal for the frequency bin.

The processor then selects a set of one or more of the frequency bins for sequential sampling to create time series signals. In one embodiment, where the acoustic fingerprint is an acoustic fingerprint for a test vehicle, the set of frequency bins selected for sampling are those that are most informative—that is, most information bearing—about the operation of a reference vehicle to which the test vehicle is to be compared. In one embodiment, the most informative representative signals may be autonomously extracted and ranked by the acoustic fingerprinting system based on a power spectral density (PSD) analysis of the representative signals, in a manner similar to that described above with reference to process block 220 of method 200.

In one embodiment, the processor creates a set of component time series signals (TSS) by sampling representative frequencies of the set of bins to extract their amplitude values at intervals over a period of time. In one embodiment, a sample is taken from a bin or representative frequency of the bin by retrieving the value of the representative frequency at a specified point in time, such as on the interval. In one embodiment, the processor samples the amplitude of the representative signal of each frequency bin at intervals to generate signal values of the TSS for the frequency bin. In one embodiment, the sampling rate for the TSS may be lower than the sampling rate of the representative frequency. The processor uses the TSSs as component signals of the acoustic fingerprint. In one embodiment, an acoustic fingerprint is thus a data structure that includes N component time series signals sampled from representative frequencies of the top N most informative frequency bins.

Process block 810 then completes, and method 800 continues at process block 815. At the completion of process block 810, the processor has generated a test acoustic fingerprint that describes or characterizes operational acoustic output of a test (surveilled) vehicle. This test acoustic fingerprint may be compared with a reference acoustic fingerprint to identify the test vehicle. Further details regarding generation of a test acoustic fingerprint from acoustic output of a test vehicle are described elsewhere herein.

At process block 815, the processor generates a similarity metric that quantifies similarity of the test acoustic fingerprint to a reference acoustic fingerprint of a reference vehicle. In this way, the test acoustic fingerprint may be compared to the reference acoustic fingerprint to determine how similar or different the acoustic fingerprints are from one another. The similarity metric is a value that quantifies the results of the comparison between test and reference acoustic fingerprints. The similarity metric thus describes similarity of the acoustic fingerprints, and by extension, the similarity of the test and reference vehicles. The similarity metric may be used as a basis for determining whether or not the test and reference vehicles match.

In one embodiment, the corresponding component TSSs of test and reference acoustic fingerprints are compared. In this comparison, signal values of the corresponding component TSSs are compared pairwise to find an absolute error (also referred to as a residual) between each pair. The mean of the absolute error for the values of the corresponding component TSSs is then calculated to find a mean absolute error (MAE) between the component TSSs. The MAE quantifies similarity or likeness of the test and reference acoustic fingerprint in the frequency range represented by the corresponding component TSSs.

In one embodiment, this process of finding the MAE is performed for more than one pair of corresponding component TSSs between the test and reference acoustic fingerprints. For example, this process of finding the MAE may be performed for each pair of corresponding component TSSs between the test and reference acoustic fingerprints. The processor then finds a cumulative MAE (CMAE) between the test and reference acoustic fingerprints by finding the sum of the MAEs. The CMAE combines the MAEs between corresponding component TSSs to produce a single similarity metric that quantifies overall similarity or likeness of the test and reference acoustic fingerprints.

In one embodiment, other similarity metrics may be substituted for the CMAE. In one embodiment, other similarity metrics that quantify similarity in the time domain of the corresponding component TSSs for test and reference acoustic fingerprints may be acceptable alternative similarity metrics to CMAE. For example, similarity metrics between test and reference acoustic fingerprints based on mean absolute scaled error, mean squared error, or root mean square error between the corresponding test and reference component TSSs may also perform acceptably.

With the generation of the similarity metric, process block 815 completes, and method 800 continues at decision block 820. At the completion of process block 815, the complex question of the extent to which acoustic output of a test vehicle resembles acoustic output of a reference vehicle has been characterized or quantified in a simple similarity metric. The values of the similarity metric for test and reference acoustic fingerprints may be used to determine whether the test and reference vehicles match.

At decision block 820, the processor compares the similarity metric to a threshold. In one embodiment, the threshold describes a level of similarity between a test and reference acoustic fingerprint that distinguishes between a match and non-match. The threshold level may differ based on how similar the acoustic output of a devices should be for them to be considered matches. The threshold level may also be governed or dictated by the nature of the match. For example, a match of a test vehicle to a make and model may have a relatively less restrictive threshold. Or, for example, a match of a test vehicle to a particular individual device may have a relatively more restrictive threshold. In one embodiment, where a lower similarity metric value represents greater similarity (such as may be the case where the similarity metric is the CMAE), a relatively smaller or lower threshold is more restrictive than a relatively larger or higher threshold.

In one embodiment, the processor evaluates whether or not the value of the similarity metric satisfies the threshold. In one comparison result, the similarity metric satisfies the threshold. For example, the value of the CMAE between the test and reference acoustic fingerprints may be less than or equal to the threshold. In another comparison result, the similarity metric does not satisfy the threshold.

For example, the value of the CMAE between the test and reference acoustic fingerprints may be greater than the threshold.

Once the processor has determined whether or not the similarity metric satisfies the threshold, decision block 820 then completes. In response to the first comparison result, method 800 continues at process block 825. In response to the second comparison result, method 800 continues at process block 830. At the completion of decision block 820, the processor has determined whether the test acoustic fingerprint is sufficiently like the reference acoustic fingerprint to be considered a match.

At process block 825, in response to a first comparison result (of the comparing of the similarity metric to the threshold) where the similarity metric satisfies the threshold, the processor indicates that the test vehicle matches the reference vehicle. In one embodiment, the processor composes and sends an electronic message indicating that the test vehicle is a match to the reference vehicle. In one embodiment, the processor causes a graphical user interface to display information indicating that the test vehicle is a match to the reference vehicle. Process block 825 then completes, and method 800 continues to END block 835, where method 800 completes.

At process block 830, in response to a second comparison result (of the comparing of the similarity metric to the threshold) where the similarity metric does not satisfy the threshold, the processor indicates that the test vehicle does not the reference vehicle. In one embodiment, the processor composes and sends an electronic message indicating that the test vehicle is not a match to the reference vehicle. In one embodiment, the processor causes a graphical user interface to display information indicating that the test vehicle does not match the reference vehicle. Process block 825 then completes, and method 800 continues to END block 835, where method 800 completes.

In one embodiment, the test vehicle is either found to be the reference vehicle itself, or found not to be the reference vehicle, based on the comparison of the similarity metric and threshold. Note that stochastic differences between vehicles of the same make and model are enough to uniquely identify the vehicle. Thus, in one embodiment, finding a match between test and reference acoustic fingerprints indicates that the test vehicle is the reference vehicle. In other words, the test vehicle and reference vehicle are a match when they are the same vehicle. Thus, in one embodiment, in response to a comparison result that indicates finding the match, the acoustic cargo surveillance system indicates that the test vehicle is the reference vehicle. And, in one embodiment, in response to a comparison result that indicates not finding the match, the acoustic cargo surveillance system indicates that the test vehicle is not the reference vehicle.

—Passive Acoustic Surveillance—

In one embodiment, the acoustic output of the test vehicle is recorded passively, for example by one or more acoustic transducers. For example, in one embodiment, acoustic energy is not directed to the test vehicle by the acoustic cargo surveillance system. Instead, energy collected from the test vehicle is generated by operation of the test vehicle (such as motor or engine noise) or generated by interaction of the test vehicle with its surroundings (such as sounds of a boat hull on water or tire noise on a road).

Advantageously, the passive nature of acoustic surveillance minimizes risk of the surveillance being detected. For example, passive recording of acoustic output does not alert operators of a target vehicle to the surveillance. This is in contrast to active surveillance activities such as RADAR, LIDAR, or SONAR, which respectively direct radio, laser, or sound energy towards the target vehicle. These active surveillance activities may be detected by operators of the test vehicle, who may then abort any illicit activity.

Example Acoustic Transducers

As used herein, an acoustic transducer refers to an apparatus that converts sound wave vibrations into electrical signals when exposed to the sound wave vibrations. For example, an acoustic transducer may be a microphone, hydrophone, or geophone as discussed in further detail herein. The electrical energy generated by the transducer from the sound wave vibrations may be amplified by an amplifier and/or recorded as a data structure in various media.

In one embodiment, the acoustic cargo surveillance system includes one or more acoustic transducers for sensing or recording acoustic output of a device. In one embodiment, acoustic output of the test vehicle is recorded using one or more acoustic transducers. In one embodiment, acoustic output of the reference device is recorded using one or more acoustic transducers. Differences between a set of acoustic transducers used to record acoustic output of a test vehicle and a set of transducers used to record acoustic output of a reference device may be corrected for by the acoustic cargo surveillance system.

In one embodiment, the acoustic transducer may be a spherically isotropic transducer that receives sound wave vibrations from multiple directions. In one embodiment, the acoustic transducer may be a directional transducer that collimates incoming sound wave vibrations from a particular direction to the transducer through a shaped channel (such as through a round or rectangular tube). In one embodiment, the particular direction is a direction toward a test vehicle or reference device. In one embodiment, the acoustic transducer may be a directional transducer that concentrates incoming sound wave vibrations from a particular direction to the transducer by reflecting the sound wave vibrations off of a reflecting inner surface such (such as off a parabolic surface or partial spherical surface). The concentrating directional transducer concentrates soundwaves impinging on a larger opening where the sound waves come in approximately parallel from a target source. In one embodiment, a directional transducer serves to exclude ambient noise from the sensed acoustic output of a test vehicle. Transducers with varying sensitivity based on direction may also be used.

In one embodiment, the acoustic cargo surveillance system uses a plurality of (or multiple) transducers. For example, the plurality of transducers are independent directional microphones. The plurality of transducers is deployed with at least several inches of separation between the transducers. In one embodiment, the plurality of transducers includes two concentrating directional microphones. Employing two or more microphones deployed with several or more inches of separation permits continuous triangulation. The triangulation allows the system to estimate with fairly high accuracy the location of a vehicle under surveillance. This allows for more precise labeling of samples as belonging to a particular vehicle under surveillance. The triangulation also allows the system to infer a rate at which a vehicle is coming closer or going away. This allows for compensation for Doppler shifts in frequency in the acoustic output received by the system.

In one embodiment, the acoustic cargo surveillance system uses just one transducer. Where just one transducer is used, the acoustic fingerprinting system compensates for Doppler shifts in frequency by sending a pulsed signal and inferring bounce-back time.

In one embodiment, an acoustic transducer may be an electromagnetic-acoustic transducer, such as a condenser transducer, a dynamic transducer, or a ribbon transducer. In a capacitance or condenser transducer, a diaphragm acts as one plate of a capacitor, in which the electrical signals are produced as electrical energy across the capacitor plates is changed when the sound wave vibrations displace the diaphragm. In a dynamic or moving-coil transducer, an induction coil is placed in a magnetic field, and the electrical signals are produced by induction as the induction coil is displaced within the magnetic field by the action of the sound wave vibrations (for example by action on a diaphragm attached to the induction coil). In a ribbon transducer, a conductive ribbon is suspended in a magnetic field, and the electrical signals are produced by induction as the ribbon is displaced within the magnetic field by the action of the sound wave vibrations.

In one example, the acoustic transducer may be a piezoelectric-acoustic transducer that generates electrical energy in proportion to the sound wave vibrations when a piezoelectric material is deformed by the sound wave vibrations. In one example, the acoustic transducer may be an optical-acoustic transducer that converts sound wave vibrations into electrical energy by sensing changes in light intensity, such as in a fiber-optic or laser microphone. Other acoustic transducers for generating electrical signals from sound wave vibrations may also be used in accordance with the acoustic cargo surveillance systems and methods described herein.

—Acoustic Fingerprint Library—

In one embodiment, the test acoustic fingerprint may be used to search a library (or other data structure(s)) of acoustic fingerprints for matching reference fingerprints. The reference acoustic fingerprint is stored in the library in association with information describing the reference vehicle. In one embodiment, a library of acoustic fingerprints is populated by entities that acoustically surveil vehicles. For example, a government entity may acoustically surveil a specific vehicle, and generate (and add to the library) an acoustic fingerprint for the surveilled vehicle. These acoustic fingerprints generated by acoustic surveillance may serve as an identifying fingerprint of the surveiled vehicle.

In one embodiment, the library includes information describing each individual fingerprinted vehicle. The information associated with a vehicle fingerprint in the library may include descriptions of type, make, model, configuration, color, or other physical properties of the device. The information associated with a vehicle fingerprint in the library may include one or more times and locations at which the vehicle has been previously surveilled acoustically. For example, the library may include timestamped GPS coordinate, latitude and longitude, address, or other geolocation information in association with the acoustic fingerprint. The information describing the vehicle fingerprint in the library may include a unique identifier of the vehicle, such as a serial number, vehicle identification number, vehicle registration number, or other descriptor of a specific vehicle. The information describing the vehicle fingerprint in the library may include identification of persons or entities associated with the vehicle, such as an owner or operator of the vehicle. Some or all of the information associated with an acoustic fingerprint for an individual vehicle in the library may be displayed in the GUI in response to the test vehicle matching the acoustic fingerprint that is stored in the library.

In one embodiment, where an acoustic fingerprint for a test vehicle is not in the library of acoustic fingerprints, for example during an initial surveillance or monitoring of the test vehicle, the acoustic fingerprint for the test vehicle may be stored in the library as a reference acoustic fingerprint. In one use case, where a target fingerprint of a boat is not in the library of known acoustic fingerprints for known makes, models, or individual devices, the acoustic fingerprint is stored as a reference and used to positively identify the vessel when interdiction craft are able to stop the vessel.

—Example Implementations of Acoustic Cargo Surveillance—

As mentioned above, acoustic cargo surveillance and acoustic fingerprinting finds one application in vehicle surveillance and interdiction. For example, the acoustic cargo surveillance systems and methods may be used to detect when boats or other vehicles involved in illegal cargo distribution pick up or drop off cargo. In one embodiment, the acoustic cargo surveillance systems and methods described herein may be used for passive surveillance of boats or other watercraft. Surveillance equipment such as acoustic transducers may be placed on shore for surveillance of watercraft in a harbor or port, or otherwise near a coastline. Surveillance equipment such as acoustic transducers may be placed on ships or otherwise in or on the water for surveillance of watercraft at sea or offshore.

In one embodiment, groups of acoustic transducers deployed across multiple watercrafts, stretches of coastline, and/or areas of water may be communicatively interconnected in order to provide multiple points of surveillance of watercraft. The interconnection may be by data networks between computing devices that collect acoustic information from the acoustic transducers. This allows watercraft to be tracked as they move through a region. Also, detection of cargo drop-offs and/or pick-ups may be detected in the second acoustic output by acoustic transducers in the group other than the acoustic transducers that gathered the first acoustic output of the initial cargo configuration of the watercraft. Further, where the acoustic transducers in the group have known locations, the location of cargo drop-offs and/or pick-ups may be triangulated using the acoustic transducers that detect the cargo drop-offs and/or pick-ups.

Cloud or Enterprise Embodiments

In one embodiment, the acoustic cargo surveillance system 100 is a computing/data processing system including an application or collection of distributed applications for enterprise organizations. The applications and computing system 100 may be configured to operate with or be implemented as a cloud-based networking system, an infrastructure-as-a-service (IAAS), platform-as-a-service (PAAS), or software-as-a-service (SAAS) architecture, or other type of networked computing solution. In one embodiment the acoustic cargo surveillance system 100 is a centralized server-side application that provides at least the functions disclosed herein and that is accessed by many users via computing devices/terminals communicating with the computing system 100 (functioning as the server) over a computer network.

In one embodiment, one or more of the components described herein may in intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/Internet protocol (TCP/IP) or other computer networking protocol. In one embodiment, components may (i) generate or compose an electronic message or signal to issue a command or request to another component, (ii) transmit the message or signal to other components, and (iii) parse the content of an electronic message or signal received to identify commands or requests that the component can perform, and in response to identifying the command, the component will automatically perform the command or request.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 9:
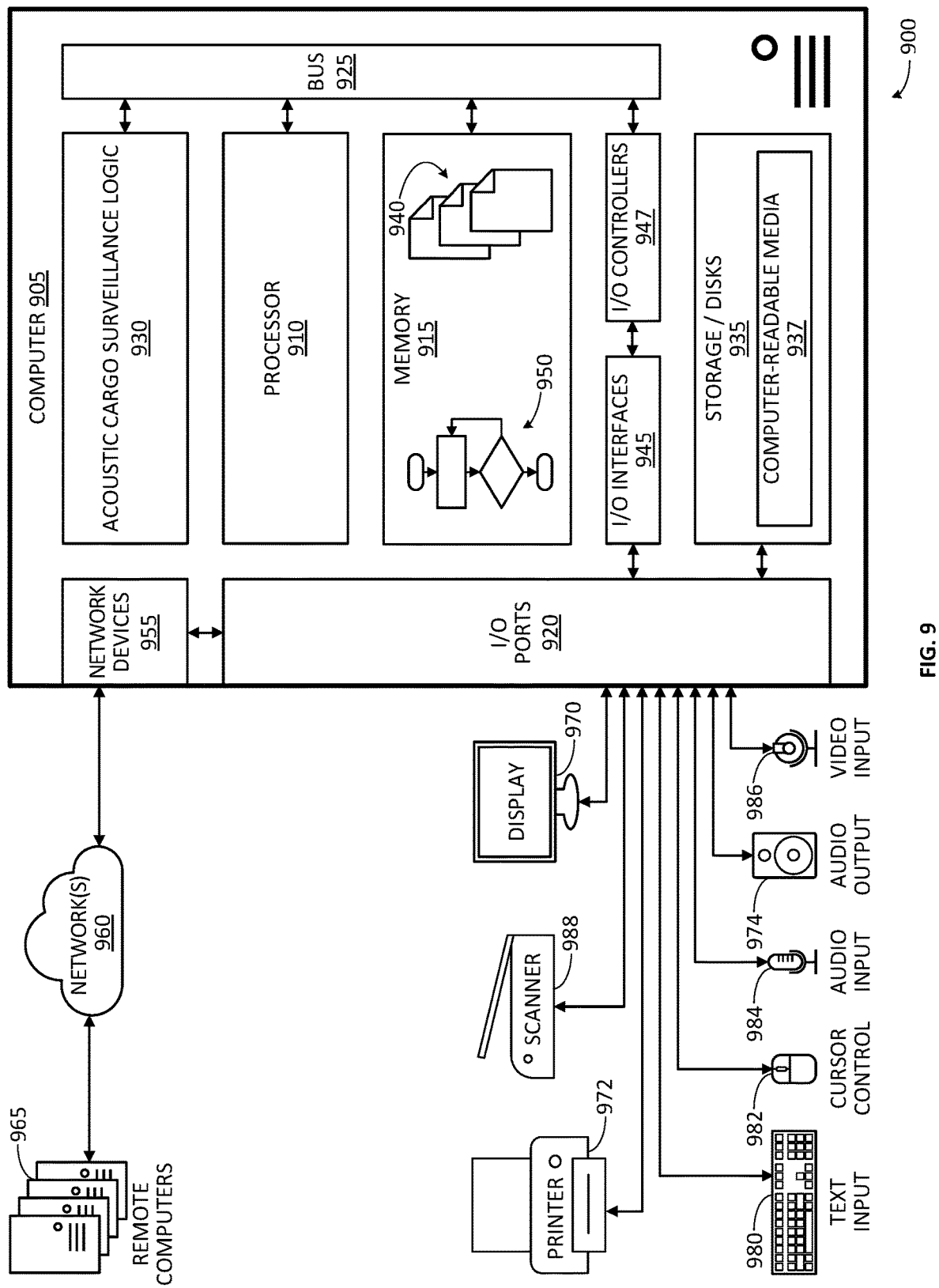
FIG. 9 illustrates an embodiment of a computing system configured with the example systems and/or methods disclosed.

FIG. 9 illustrates an example computing device 900 that is configured and/or programmed as a special purpose computing device with one or more of the example systems and methods described herein, and/or equivalents. The example computing device may be a computer 905 that includes at least one hardware processor 910, a memory 915, and input/output ports 920 operably connected by a bus 925. In one example, the computer 905 may include acoustic cargo surveillance logic 930 configured to facilitate acoustic detection of changes in cargo mass carried by vehicles, similar to logic, systems, and methods shown and described herein for example with reference to FIGS. 1-8.

In different examples, acoustic cargo surveillance logic 930 may be implemented in hardware, a non-transitory computer-readable medium 937 with stored instructions, firmware, and/or combinations thereof. While acoustic cargo surveillance logic 930 is illustrated as a hardware component attached to the bus 925, it is to be appreciated that in other embodiments, the acoustic cargo surveillance logic 930 could be implemented in the processor 910, stored in memory 915, or stored in disk 935.

In one embodiment, acoustic cargo surveillance logic 930 or the computer 905 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate acoustic detection of changes in cargo mass carried by vehicles. The means may also be implemented as stored computer executable instructions that are presented to computer 905 as data 940 that are temporarily stored in memory 915 and then executed by processor 910.

Acoustic cargo surveillance logic 930 may also provide means (e.g., hardware, non-transitory computer-readable medium that stores executable instructions, firmware) for performing acoustic detection of changes in cargo mass carried by vehicles.

Generally describing an example configuration of the computer 905, the processor 910 may be a variety of various processors including dual microprocessor and other multi-processor or multi-core architectures. A memory 915 may include volatile memory and/or non-volatile memory. Non-volatile memory may include, for example, ROM, PROM, and so on. Volatile memory may include, for example, RAM, SRAM, DRAM, and so on.

A storage disk 935 may be operably connected to the computer 905 via, for example, an input/output (I/O) interface (e.g., card, device) 945 and an input/output port 920 that are controlled by at least an input/output (I/O) controller 947. The disk 935 may be, for example, a magnetic disk drive, a solid-state disk drive, a floppy disk drive, a tape drive, a Zip drive, a flash memory card, a memory stick, and so on. Furthermore, the disk 935 may be a CD-ROM drive, a CD-R drive, a CD-RW drive, a DVD ROM, and so on. The memory 915 can store a process 950 and/or data 940, for example. The disk 935 and/or the memory 915 can store an operating system that controls and allocates resources of the computer 905.

In one embodiment, non-transitory computer-readable medium 937 includes computer-executable instructions such as software. In general computer-executable instructions are designed to be executed by one or more processors 910 accessing memory 915 or other components of computer 905. These computer-executable instructions may include, for example, computer-executable code and source code that may be compiled into computer-executable code or interpreted for execution.

The computer 905 may interact with, control, and/or be controlled by input/output (I/O) devices via the input/output (I/O) controller 947, the I/O interfaces 945, and the input/output ports 920. Input/output devices may include, for example, one or more displays 970, printers 972 (such as inkjet, laser, or 3D printers), audio output devices 974 (such as speakers or headphones), text input devices 980 (such as keyboards), cursor control devices 982 for pointing and selection inputs (such as mice, trackballs, touch screens, joysticks, pointing sticks, electronic styluses, electronic pen tablets), audio input devices 984 (such as acoustic transducers as described in detail above, or external audio players), video input devices 986 (such as video and still cameras, or external video players), image scanners 988, video cards (not shown), disks 935, network devices 955, and so on. The input/output ports 920 may include, for example, serial ports, parallel ports, and USB ports.

The computer 905 can operate in a network environment and thus may be connected to the network devices 955 via the I/O interfaces 945, and/or the I/O ports 920. Through the network devices 955, the computer 905 may interact with a network 960. Through the network, the computer 905 may be logically connected to remote computers 965. Networks with which the computer 905 may interact include, but are not limited to, a LAN, a WAN, and other networks.

In one embodiment, computer 905 may be configured with hardware to process heavy workloads (such as those involved in acoustic detection of cargo mass changes from fine-frequency acoustic output) at high speed with high reliability, for example by having high processing throughput and/or large memory or storage capacity. In one embodiment, computer 905 is configured to execute cloud-scale applications locally where network access is limited.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method comprising:
    recording a first acoustic output of a vehicle carrying cargo at a first time of surveillance of the vehicle;
    recording a second acoustic output of the vehicle at a subsequent time in the surveillance of the vehicle carrying the cargo;
    acoustically detecting a change in a mass of the cargo carried by the vehicle based at least on an acoustic change between the first acoustic output and the second acoustic output, wherein the acoustic change is determined by:
        generating a reference Kiviat surface from the first acoustic output,
        generating a test Kiviat surface from the second acoustic output, and
        computing a residual area between the reference Kiviat surface and the test Kiviat surface, wherein the residual area represents the acoustic change; and
    generating an electronic alert that the mass of the cargo has changed based on the acoustic change.

2. The method of claim 1, wherein computing the residual area further includes normalizing the reference Kiviat surface and the test Kiviat surface to a unit circle of the reference Kiviat surface before computing the residual area.

3. The method of claim 1, wherein computing the residual area further comprises:
    identify a set of component frequencies of the first acoustic output that are most informative about operation of the vehicle; and
    select the component frequencies to be axes for the reference Kiviat surface and the test Kiviat surface.

4. The method of claim 1, further comprising:
    select component frequencies of the first acoustic output that are most informative about operation of the vehicle;

generating estimated values for the component frequencies from the second acoustic output using a machine learning model, wherein the machine learning model has been trained to generate the estimated values to be consistent with no change in cargo mass;

generating residual values from the estimated values and actual values for the component frequencies from the second acoustic output, wherein the residual values represent the acoustic change;

detecting the residual values to be an anomalous acoustic change that indicates a change in cargo mass.

5. The method of claim 1, further comprising passively recording the first acoustic output and the second acoustic output with one or more acoustic transducers that are located remotely from the vehicle.

6. The method of claim 1, further comprising displaying a graphical user interface that includes a visual indication of a status of the electronic alert and a visual representation of the test Kiviat surface in a Kiviat tube of Kiviat surfaces for the vehicle at times other than that of the test Kiviat surface.

7. The method of claim 1, further comprising:
generating a first acoustic fingerprint of the vehicle from the first acoustic output of the vehicle;
generating a second acoustic fingerprint of the vehicle from the second acoustic output of the vehicle; and
acoustically confirming that the first acoustic fingerprint matches the second acoustic fingerprint to verify that the first acoustic output and the second acoustic output were both recorded from the vehicle.

8. The method of claim 1, further comprising identifying that the vehicle has undergone a step-change shift in mass during operation.

9. The method of claim 1, wherein the change in the mass of the cargo is detected where the residual area satisfies a threshold area.

10. A non-transitory computer-readable medium storing computer-executable instructions that when executed by at least a processor of a computer cause the computer to:
record a first acoustic output of a vehicle carrying cargo at a first time of surveillance of the vehicle;
record a second acoustic output of the vehicle at a subsequent time in the surveillance of the vehicle carrying the cargo;
acoustically detect a change in a mass of the cargo carried by the vehicle based at least on an acoustic change between the first acoustic output and the second acoustic output, wherein the acoustic change is determined by comparison of Kiviat surfaces representing the first acoustic output and the second acoustic output; and
generate an electronic alert that the mass of the cargo has changed based on the acoustic change.

11. The non-transitory computer-readable medium of claim 10, further including instructions to determine the acoustic change that cause the computer to:
generate a reference Kiviat surface from the first acoustic output;
generate a test Kiviat surface from the second acoustic output;
normalize the reference Kiviat surface and the test Kiviat surface to a unit circle of the reference Kiviat surface;
compute a residual area between the reference Kiviat surface and the test Kiviat surface, wherein the residual area represents the acoustic change.

12. The non-transitory computer-readable medium of claim 10, wherein the first acoustic output and the second acoustic output comprise engine noise that is produced by operation of an engine of the vehicle.

13. The non-transitory computer-readable medium of claim 10,
wherein the vehicle is a watercraft.

14. The non-transitory computer-readable medium of claim 10,
wherein the vehicle is an aircraft.

15. The non-transitory computer-readable medium of claim 10,
wherein the instructions further cause the computer to:
passively record the first acoustic output and the second acoustic output using one or more acoustic transducers that are located remotely from the vehicle.

16. A computing system, comprising:
a processor;
a memory operably connected to the processor;
a non-transitory computer-readable medium operably connected to the processor and memory and storing computer-executable instructions that when executed by at least the processor cause the computing system to:
record a first acoustic output of a vehicle carrying cargo at a first time of surveillance of the vehicle;
record a second acoustic output of the vehicle at a subsequent time in the surveillance of the vehicle carrying the cargo;
acoustically detect a change in a mass of the cargo carried by the vehicle based at least on an acoustic change between the first acoustic output and the second acoustic output, wherein the acoustic change is determined by comparison of Kiviat surfaces representing the first acoustic output and the second acoustic output; and
generate an electronic alert that the mass of the cargo has changed based on the acoustic change.

17. The computing system of claim 16, wherein the computer-readable medium further includes instructions to determine the acoustic change that cause the computing system to:
select a number of component frequencies of the first acoustic output that are most informative about operation of the vehicle to be axes for a reference Kiviat surface and a test Kiviat surface;
generate the reference Kiviat surface from the first acoustic output;
generate the test Kiviat surface from the second acoustic output;
normalize the reference Kiviat surface and the test Kiviat surface to a unit circle of the reference Kiviat surface;
compute a residual area between the reference Kiviat surface and the test Kiviat surface, wherein the residual area represents the acoustic change.

18. The computing system of claim 16, wherein the first acoustic output and the second acoustic output comprise engine noise that is produced by operation of an engine of the vehicle, and wherein the instructions further cause the computing system to passively record the first acoustic output and the second acoustic output with one or more acoustic transducers that are located remotely from the vehicle.

19. The computing system of claim 16, wherein the instructions further cause the computing system to display a graphical user interface that includes a visual indication of a status of the electronic alert.

20. The computing system of claim 16, wherein the instructions further cause the computing system to:
generate a first acoustic fingerprint of the vehicle from the first acoustic output of the vehicle;

generate a second acoustic fingerprint of the vehicle from the second acoustic output of the vehicle; and acoustically confirm that the first acoustic fingerprint matches the second acoustic fingerprint to verify that the first acoustic output and the second acoustic output were both recorded from the vehicle.

\* \* \* \* \*